(12) United States Patent
Yokoyama et al.

(10) Patent No.: US 10,718,044 B2
(45) Date of Patent: Jul. 21, 2020

(54) HOT-DIP GALVANIZED STEEL SHEET

(71) Applicant: NIPPON STEEL & SUMITOMO METAL CORPORATION, Tokyo (JP)

(72) Inventors: Takafumi Yokoyama, Tokyo (JP); Kunio Hayashi, Tokyo (JP); Masafumi Azuma, Tokyo (JP); Eisaku Sakurada, Tokyo (JP); Hiroyuki Kawata, Tokyo (JP); Genki Abukawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/092,947

(22) PCT Filed: Jul. 15, 2016

(86) PCT No.: PCT/JP2016/070982
§ 371 (c)(1),
(2) Date: Oct. 11, 2018

(87) PCT Pub. No.: WO2018/011978
PCT Pub. Date: Jan. 18, 2018

(65) Prior Publication Data
US 2019/0169729 A1    Jun. 6, 2019

(51) Int. Cl.
*C23C 2/06* (2006.01)
*C23C 2/02* (2006.01)
(Continued)

(52) U.S. Cl.
CPC ............... *C23C 2/06* (2013.01); *B32B 15/00* (2013.01); *B32B 15/01* (2013.01); *B32B 15/013* (2013.01);
(Continued)

(58) Field of Classification Search
CPC ....... C22C 38/28; C22C 38/002; C22C 38/54; C22C 38/48; C22C 38/50; C22C 38/02;
(Continued)

(56) References Cited

U.S. PATENT DOCUMENTS

2009/0238713 A1    9/2009  Kinugasa et al.
2010/0132848 A1    6/2010  Ikeda et al.
(Continued)

FOREIGN PATENT DOCUMENTS

EP    2998414 A1    3/2016
JP    6-145891 A    5/1994
(Continued)

OTHER PUBLICATIONS

"Estimation of Dislocation Density by X-ray Diffraction method", CAMP-ISIJ, 2004, vol. 17, pp. 396-399, total 5 pages.
(Continued)

*Primary Examiner* — Michael E. La Villa
(74) *Attorney, Agent, or Firm* — Birch, Stewart, Kolasch & Birch, LLP

(57) ABSTRACT

A hot-dip galvanized steel sheet includes: a predetermined chemical composition; and a steel structure represented by: in terms of area ratio, polygonal ferrite: 10% or less; upper bainite: 20% or less; retained austenite: 5% or less; and martensite: 70% or more, in which: martensite having Fe carbides at a number density of $1\times10^6/mm^2$ or more is contained by 50% or more, in terms of area ratio, with respect to the entire amount of martensite; and the steel structure has an average effective crystal grain diameter of 5.0 μm or less.

7 Claims, 2 Drawing Sheets

(51) Int. Cl.

| | | |
|---|---|---|
| *C22C 38/54* | (2006.01) | |
| *C22C 38/58* | (2006.01) | |
| *C22C 38/06* | (2006.01) | |
| *C22C 38/00* | (2006.01) | |
| *C22C 38/50* | (2006.01) | |
| *C22C 38/48* | (2006.01) | |
| *C22C 38/46* | (2006.01) | |
| *C22C 38/44* | (2006.01) | |
| *C22C 38/42* | (2006.01) | |
| *C21D 9/46* | (2006.01) | |
| *C22C 38/08* | (2006.01) | |
| *C22C 38/12* | (2006.01) | |
| *C22C 38/16* | (2006.01) | |
| *C22C 38/32* | (2006.01) | |
| *C22C 38/02* | (2006.01) | |
| *C22C 38/14* | (2006.01) | |
| *C22C 38/04* | (2006.01) | |
| *C22C 38/28* | (2006.01) | |
| *C22C 38/18* | (2006.01) | |
| *C22C 38/40* | (2006.01) | |
| *C22C 38/24* | (2006.01) | |
| *C22C 38/38* | (2006.01) | |
| *C22C 38/22* | (2006.01) | |
| *C22C 38/20* | (2006.01) | |
| *C22C 38/26* | (2006.01) | |
| *C23C 30/00* | (2006.01) | |
| *C23C 2/40* | (2006.01) | |
| *C23C 2/26* | (2006.01) | |
| *C23C 2/34* | (2006.01) | |
| *B32B 15/00* | (2006.01) | |
| *B32B 15/04* | (2006.01) | |
| *B32B 15/01* | (2006.01) | |
| *B32B 15/18* | (2006.01) | |

(52) U.S. Cl.
CPC .......... *B32B 15/04* (2013.01); *B32B 15/043* (2013.01); *B32B 15/18* (2013.01); *C21D 9/46* (2013.01); *C22C 38/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/02* (2013.01); *C23C 2/26* (2013.01); *C23C 2/34* (2013.01); *C23C 2/40* (2013.01); *C23C 30/00* (2013.01); *C23C 30/005* (2013.01); *C21D 2211/004* (2013.01); *C21D 2211/008* (2013.01); *Y10T 428/12799* (2015.01); *Y10T 428/12951* (2015.01); *Y10T 428/12958* (2015.01); *Y10T 428/12972* (2015.01); *Y10T 428/26* (2015.01)

(58) Field of Classification Search
CPC ......... C22C 38/44; C22C 38/46; C22C 38/06; C22C 38/001; C22C 38/005; C22C 38/04; C22C 38/16; C22C 38/08; C22C 38/12; C22C 38/42; C22C 38/14; C22C 38/58; C22C 38/00; C22C 38/32; C22C 38/18; C22C 38/20; C22C 38/22; C22C 38/24; C22C 38/26; C22C 38/34; C22C 38/38; C22C 38/40; C23C 2/02; C23C 2/06; C23C 2/26; C23C 2/34; C23C 2/40; C23C 30/00; C23C 30/005; C21D 9/46; C21D 2211/004; C21D 2211/008; B32B 15/00; B32B 15/01; B32B 15/013; B32B 15/04; B32B 15/043; B32B 15/18; Y10T 428/12799; Y10T 428/12951; Y10T 428/12972; Y10T 428/12958; Y10T 428/26

See application file for complete search history.

(56) References Cited

U.S. PATENT DOCUMENTS

| | | |
|---|---|---|
| 2011/0048589 A1 | 3/2011 | Matsuda et al. |
| 2012/0222781 A1 | 9/2012 | Azuma et al. |
| 2013/0048151 A1 | 2/2013 | Kawamura et al. |
| 2014/0227555 A1 | 8/2014 | Kawata et al. |
| 2014/0234657 A1 | 8/2014 | Azuma et al. |
| 2014/0234660 A1 | 8/2014 | Kawata et al. |
| 2014/0238557 A1 | 8/2014 | Haga et al. |
| 2015/0013856 A1 | 1/2015 | Murakami et al. |
| 2015/0083278 A1 | 3/2015 | Kawata et al. |
| 2015/0329950 A1* | 11/2015 | Azuma ............... C21D 9/46 148/533 |
| 2015/0376730 A1 | 12/2015 | Shuto et al. |
| 2016/0160310 A1 | 6/2016 | Hasegawa et al. |
| 2016/0273066 A1 | 9/2016 | Sakakibara et al. |
| 2017/0275726 A1 | 9/2017 | Hasegava et al. |

FOREIGN PATENT DOCUMENTS

| | | |
|---|---|---|
| JP | 6-145893 A | 5/1994 |
| JP | 9-111398 A | 4/1997 |
| JP | 10-1740 A | 1/1998 |
| JP | 2004-32951 A | 11/2004 |
| JP | 2007-197819 A | 8/2007 |
| JP | 2009-203549 A | 9/2009 |
| JP | 2009-278102 A | 12/2009 |
| JP | 2010-126787 A | 6/2010 |
| JP | 2011-52321 A | 3/2011 |
| JP | 2013-144830 A | 7/2013 |
| JP | 2014-118613 A | 6/2014 |
| JP | 2015-175050 A | 1/2015 |
| KR | 10-2008-0073763 A | 8/2008 |
| KR | 10-2014-0033226 A | 3/2014 |
| TW | 201502287 A | 1/2015 |
| WO | WO 2011/065591 A1 | 6/2011 |
| WO | WO 2011/105385 A1 | 9/2011 |
| WO | WO 2013/047755 A1 | 4/2013 |
| WO | WO 2013/047821 A1 | 4/2013 |
| WO | WO 2014/185405 A1 | 11/2014 |
| WO | WO 2016/031165 A1 | 3/2016 |

OTHER PUBLICATIONS

International Search Report for PCT/JP2016/070982 dated Sep. 13, 2016.
Kurayasu et al., "Determination of Boron in Steels and in the Precipitates Using Sulfuric Acid Containing Ammonium Sulfate and Phase Analysis of Boron in Steels", Tetsu-to-Hagane, 1988, vol. 74, pp. 2353-2360, total 10 pages.
Written Opinion of the International Searching Authority for PCT/JP2016/070982 (PCT/ISA/237) dated Sep. 13, 2016.
Extended European Search Report for European Application No. 16908879.6, dated Jul. 31, 2019.
English translation of International Preliminary Report on Patentability and Written Opinion dated Jan. 24, 2019, in PCT/JP2016/070982 (Forms PCT/IB/338, PCT/IB/373, and PCT/ISA/237).

(56) References Cited

OTHER PUBLICATIONS

Korean Office Action for corresponding Korean Application No. 10-2018-7031102, dated Apr. 13, 2020, with English translation.

* cited by examiner

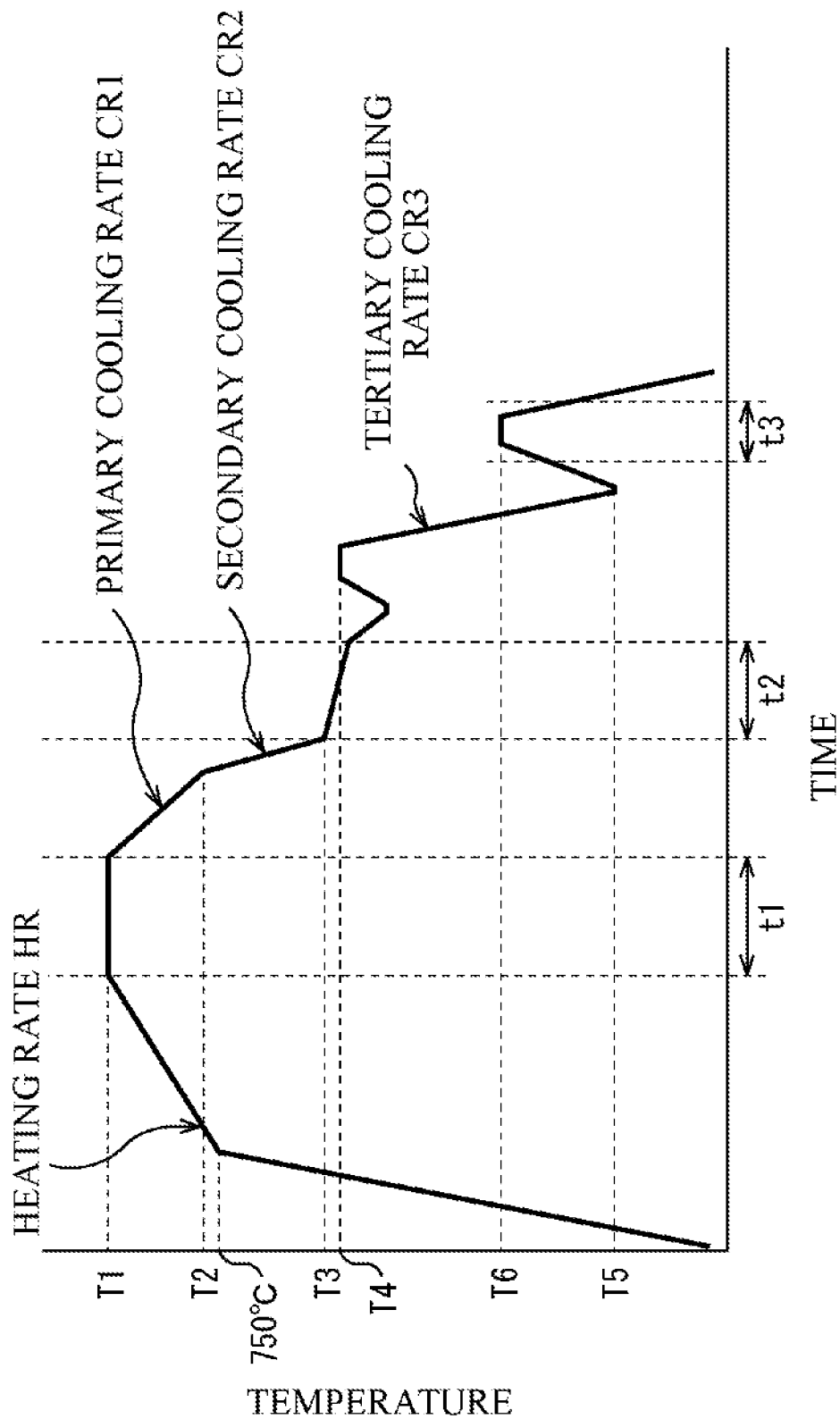

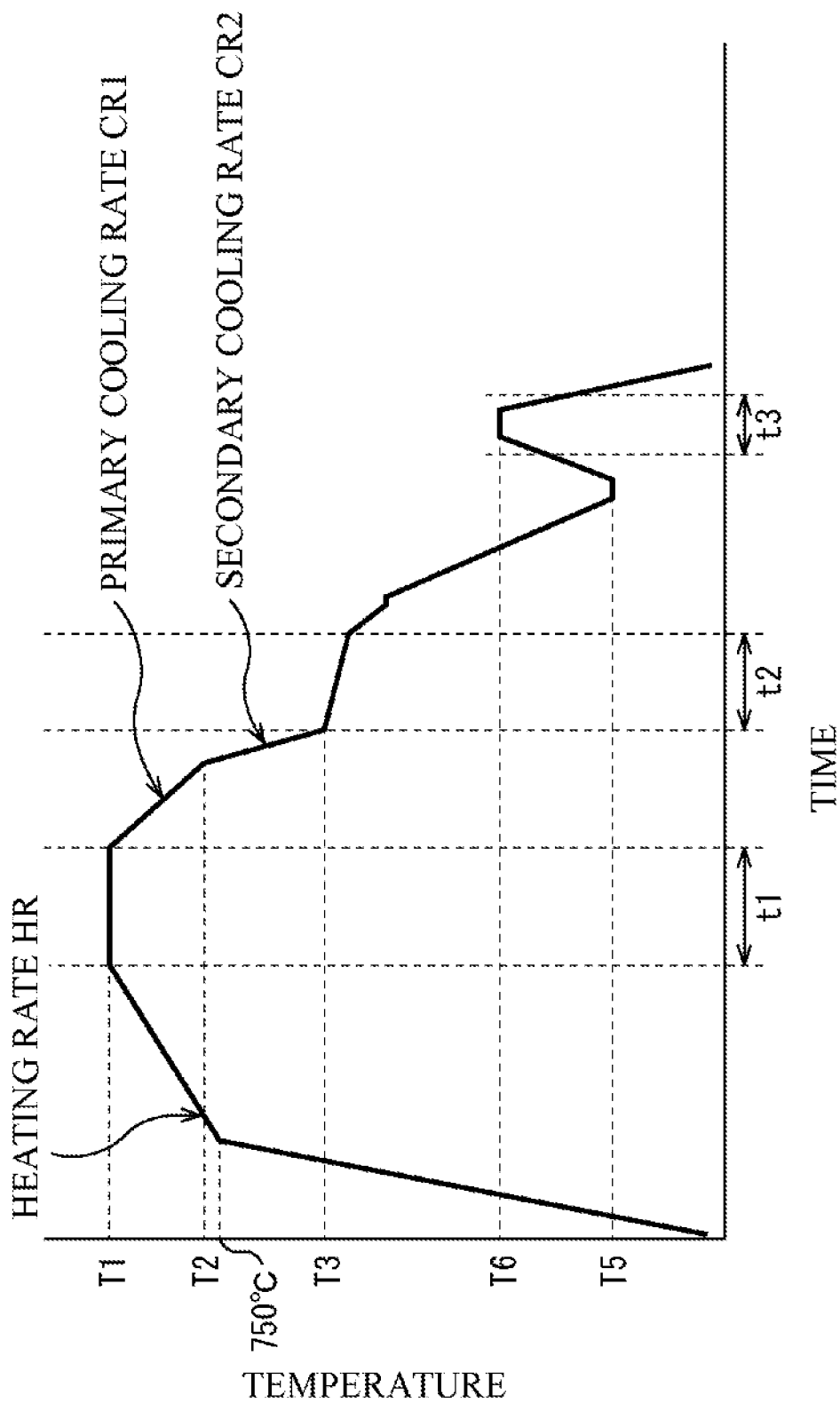

HOT-DIP GALVANIZED STEEL SHEET

TECHNICAL FIELD

The present invention relates to a hot-dip galvanized steel sheet excellent in hydrogen embrittlement resistance and having a high yield ratio and an ultrahigh strength. Concretely, the present invention relates to an automotive hot-dip galvanized steel sheet excellent in hydrogen embrittlement resistance and having a high yield ratio and an ultrahigh strength, which has excellent workability and is formed in various shapes through mainly a presswork and the like.

BACKGROUND ART

In recent years, as countermeasures against global warming, improvement of fuel economy of an automobile has been demanded from a viewpoint of regulating a greenhouse effect gas emission amount. Accordingly, in order to realize reduction in weight of a vehicle body and to secure collision safety, a high-strength steel sheet is increasingly applied. Further, to a portion required to have rust prevention, an ultrahigh-strength steel sheet which is subjected to hot-dip galvanizing is required to be applied.

Particularly, in recent years, needs for an ultrahigh-strength steel sheet and an ultrahigh-strength hot-dip galvanized steel sheet having a tensile strength of 1300 MPa or more is increasing. Besides, to a member required to suppress deformation at a time of collision, an ultrahigh-strength steel sheet having a high yield ratio is required to be applied.

However, when applying an ultrahigh-strength steel sheet whose tensile strength exceeds 1300 MPa, there is a need to solve hydrogen embrittlement of the steel sheet. The hydrogen embrittlement is a phenomenon in which a steel member to which a high stress is applied in a situation of being used is fractured by an additional stress being equal to or less than a maximum tensile stress due to hydrogen which enters from an environment.

Generally, as a tensile strength of a steel sheet increases, the hydrogen embrittlement resistance of the steel sheet deteriorates, and its mechanism itself has not been clarified yet.

Various attempts to improve the hydrogen embrittlement of steel sheets have been made so far. Examination cases thereof will be described below.

Patent Literature 1 discloses a technique regarding a high-strength steel sheet which realizes both of high strengthening and hydrogen embrittlement resistance in a manner that a decarburization treatment is performed on a surface layer of a steel sheet to increase a ferrite volume fraction of the surface layer of the steel sheet, which causes softening, a structure inside the steel sheet is mainly constituted of ferrite, and besides, a small amount of martensite having fine blocks is dispersed. However, the steel sheet described in Patent Literature 1 contains a considerable amount of ferrite being a soft structure, so that it is not preferable for obtaining a high yield ratio.

Patent Literature 2 discloses a technique regarding a high-strength hot-dip galvanized steel sheet which realizes both of workability and hydrogen embrittlement resistance by properly controlling an average grain diameter and an aspect ratio as a form of ferrite. However, the steel sheet described in Patent Literature 2 also contains a certain amount of ferrite being a soft structure, so that it is predicted that the steel sheet is not preferable for obtaining a high yield ratio.

Patent Literature 3 discloses a technique regarding a high-strength hot-dip galvanized steel sheet which improves the hydrogen embrittlement resistance by setting a steel structure to a structure mainly constituted of martensite, and by making carbides of Nb, V, Cr, Ti, and Mo and the like to be precipitated and making the carbides function as hydrogen trap sites. However, also in the steel sheet described in Patent Literature 3, a high yield ratio is not taken into consideration.

Patent Literature 4 discloses a technique regarding a high-strength hot-dip galvanized steel sheet which improves the hydrogen embrittlement resistance by setting a steel structure to a structure mainly constituted of bainite, and by regulating retained austenite to less than 4%.

However, bainite generated in a hot-dip galvanizing process is often upper bainite due to its retention temperature region. The upper bainite is a structure with inferior toughness when compared to tempered martensite and lower bainite, so that reduction in toughness is concerned in a steel sheet having upper bainite as a main structure.

CITATION LIST

Patent Literature

Patent Literature 1: International Publication Pamphlet No. WO 2011/065591

Patent Literature 2: Japanese Laid-open Patent Publication No. 2010-126787

Patent Literature 3: Japanese Laid-open Patent Publication No. 2004-323951

Patent Literature 4: Japanese Laid-open Patent Publication No. 06-145893

Patent Literature 5: Japanese Laid-open Patent Publication No. 2013-144830

Patent Literature 6: Japanese Laid-open Patent Publication No. 2009-203549

Patent Literature 7: International Publication Pamphlet No. WO 2013/047821

Patent Literature 8: International Publication Pamphlet No. WO 2013/047755

Patent Literature 9: Japanese Laid-open Patent Publication No. 10-001740

Patent Literature 10: Japanese Laid-open Patent Publication No. 09-111398

Patent Literature 11: Japanese Laid-open Patent Publication No. 06-145891

Patent Literature 12: Specification of International Publication Pamphlet No. WO 2011/105385

Patent Literature 13: Japanese Laid-open Patent Publication No. 2007-197819

Non-Patent Literature

Non-Patent Literature 1: CAMP-ISIJ Vol. 17 (2004) p. 396

Non-Patent Literature 2: Tetsu-to-Hagane, vol. 74 (1988), p. 2353

SUMMARY OF INVENTION

Technical Problem

The present invention has an object to provide a hot-dip galvanized steel sheet excellent in hydrogen embrittlement resistance and capable of obtaining a high tensile strength and a high yield ratio.

Solution to Problem

The present inventors conducted earnest studies regarding a method of obtaining a hot-dip galvanized steel sheet excellent in hydrogen embrittlement resistance and capable of obtaining a high tensile strength, which is, a tensile strength of 1300 MPa or more, for example, and a high yield ratio, which is, a yield ratio of 75% or more, for example, and as a result of this, they obtained the following findings.

(a) Area ratios of ferrite and upper bainite are regulated to predetermined area ratios or less to form a structure mainly constituted of martensite.

(b) In order to suppress progress of a hydrogen embrittlement crack along a prior austenite grain boundary, a certain amount of B being a grain boundary strengthening element is contained, and besides, an average effective crystal grain diameter of martensite and the like is controlled to be a predetermined grain diameter or less.

(c) An area ratio of martensite having Fe carbides at a predetermined number density or more with respect to the entire amount of martensite is set to 50% or more.

It was found out that when all of (a), (b), and (c) are satisfied, it is possible to achieve desired mechanical properties and hydrogen embrittlement resistance.

The present invention has been made based on the above-described findings, and the gist thereof is as follows.

(1)

A hot-dip galvanized steel sheet is characterized in that it includes:
a chemical composition represented by:
in terms of mass %,
C: 0.14 to 0.3%;
Si: 0.001 to 2.0%;
Mn: 2.0 to 4.0%;
P: 0.05% or less;
S: 0.01% or less;
N: 0.01% or less;
Al: 0.001 to 1.0%;
Ti: 0.001 to 0.10%;
B: 0.0001 to 0.01%;
Mo: 0 to 0.50%;
Cr: 0 to 0.80%;
Ni: 0 to 1.00%;
Cu: 0 to 1.00%;
V: 0 to 0.50%;
Nb: 0.0 to 0.10%;
Ca: 0.00 to 0.01%;
Mg: 0.00 to 0.01%;
REM: 0.00 to 0.01%;
Bi: 0.00 to 0.01%; and
the balance: Fe and impurities; and
a steel structure represented by:
in terms of area ratio,
polygonal ferrite: 10% or less;
upper bainite: 20% or less;
retained austenite: 5% or less; and
martensite: 70% or more, in which:
martensite having Fe carbides at a number density of $1\times10^6/mm^2$ or more is contained by 50% or more, in terms of area ratio, with respect to the entire amount of martensite; and
the steel structure has an average effective crystal grain diameter of 5.0 μm or less.

(2)

The hot-dip galvanized steel sheet described in (1) is characterized in that an amount of solid-solution B is 0.0010 mass % to 0.0100 mass %, and a prior austenite grain diameter is 1.0 μm to 7.0 μm.

(3)

The hot-dip galvanized steel sheet described in (2) is characterized in that a product of the amount of solid-solution B and the prior austenite grain diameter is 0.0010 mass %·μm or more.

(4)

The hot-dip galvanized steel sheet described in any one of (1) to (3) is characterized in that in the chemical composition, Mo: 0.001 to 0.50% is satisfied.

(5)

The hot-dip galvanized steel sheet described in any one of (1) to (4) is characterized in that in the chemical composition,
Cr: 0.001 to 0.80%,
Ni: 0.001 to 1.00%, or
Cu: 0.001 to 1.00%, or
any combination thereof is satisfied.

(6)

The hot-dip galvanized steel sheet described in any one of (1) to (5) is characterized in that in the chemical composition,
V: 0.001 to 0.50%, or
Nb: 0.001 to 0.10%, or
both thereof are satisfied.

(7)

The hot-dip galvanized steel sheet described in any one of (1) to (6) is characterized in that in the chemical composition,
Ca: 0.0001 to 0.01%,
Mg: 0.0001 to 0.01%,
REM: 0.0001 to 0.01%, or
Bi: 0.0001 to 0.01%, or
any combination thereof is satisfied.

Advantageous Effects of Invention

According to the present invention, it is possible to realize excellent hydrogen embrittlement resistance and to obtain a high tensile strength and a high yield ratio.

BRIEF DESCRIPTION OF DRAWINGS

FIG. 1 is a diagram schematically illustrating processes of a heat treatment and plating adopted in Example 1; and FIG. 2 is a diagram schematically illustrating processes of a heat treatment and plating adopted in Example 2.

DESCRIPTION OF EMBODIMENTS

First, a chemical composition of a hot-dip galvanized steel sheet according to an embodiment of the present invention and a slab used for manufacturing the hot-dip galvanized steel sheet will be described. Although details will be described later, the hot-dip galvanized steel sheet according to the embodiment of the present invention is manufactured through hot rolling of a slab, cold rolling, continuous annealing, a hot-dip galvanizing treatment, and tempering and the like. Therefore, the chemical composition of the hot-dip galvanized steel sheet and the slab takes not only properties of the hot-dip galvanized steel sheet but also these treatments into consideration. In the following description, "%" being a unit of content of each element contained in the hot-dip galvanized steel sheet means "mass %" unless otherwise mentioned. The hot-dip galvanized steel sheet according to the embodiment of the present invention has a chemical composition represented by, in terms of mass %, C: 0.14 to 0.3%, Si: 0.001 to 2.0%, Mn: 2.0 to 4.0%, P: 0.05% or less, S: 0.01% or less, N: 0.01% or less, Al: 0.001 to 1.0%, Ti: 0.001 to 0.10%, B: 0.0001 to 0.01%, Mo: 0 to 0.50%, Cr: 0 to 0.80%, Ni: 0 to 1.00%, Cu: 0 to 1.00%, V: 0 to 0.50%, Nb: 0.0 to 0.10%, Ca: 0.00 to 0.01%, Mg: 0.00 to 0.01%, REM (rare earth metal): 0.00 to 0.01%, Bi: 0.00 to 0.01%, and the balance: Fe and impurities. Here, examples of the impurities are those contained in a raw material such as an ore or scrap, and those contained during manufacturing processes.

(C: 0.14 to 0.3%)

C is an element which is essential for obtaining a desired tensile strength. If a content of C is less than 0.14%, it is not possible to obtain the desired tensile strength, so that the content is set to 0.14% or more. The content is preferably 0.17% or more. On the other hand, if the content exceeds 0.3%, the hydrogen embrittlement resistance and weldability are lowered, so that the content is set to 0.3% or less. The content is preferably 0.25% or less, and more preferably 0.22% or less.

(Si: 0.001 to 2.0%)

Si is an element which is effective for realizing high strengthening of a steel sheet. If a content of Si is less than 0.001%, an effect of addition is not exhibited, so that the content is set to 0.001% or more. The content is preferably 0.010% or more. On the other hand, if the content exceeds 2.0%, wettability with hot-dip galvanizing and an alloying rate are lowered. Further, since Si is a ferrite-generating element, if the Si content exceeds 2.0%, it becomes difficult to set an area ratio of polygonal ferrite to 10% or less. Therefore, the Si content is set to 2.0% or less. The content is preferably 1.50% or less, more preferably 0.90% or less, and still more preferably 0.50% or less.

(Mn: 2.0 to 4.0%)

Mn is a strong austenite stabilizing element, and is an element which is effective for improving hardenability of the steel sheet. If a content of Mn is less than 2.0%, an effect of addition is not sufficiently exhibited, so that the content is set to 2.0% or more. The content is preferably 2.2% or more. On the other hand, if the content exceeds 4.0%, the hydrogen embrittlement resistance is lowered, so that the content is set to 4.0% or less. The content is preferably 3.5% or less, and more preferably 3.0% or less.

(P: 0.05% or less)

P is a solid-solution strengthening element, and is an element which is effective for realizing high strengthening of the steel sheet. However, if a content of P exceeds 0.05%, the weldability and toughness are lowered, so that the content is set to 0.05% or less. The content is preferably 0.02% or less. Although a lower limit of the content is not particularly limited, about 0.001% is a substantial lower limit from a practical standpoint.

(S: 0.01% or less)

S is an impurity element, and thus the lower the content thereof, the better. If the content exceeds 0.01%, S forms MnS in the steel to make the toughness and hole expandability deteriorate, so that the content is set to 0.01% or less.

The content is preferably 0.005% or less, and more preferably 0.002% or less. Although a lower limit of the content is not particularly limited, about 0.0001% is a substantial lower limit from a practical standpoint.

(N: 0.01% or less)

N is an impurity element, and thus the lower the content thereof, the better. If the content exceeds 0.01%, a coarse nitride is generated in the steel to lower the hole expandability, so that the content is set to 0.01% or less. The content is preferably 0.005% or less. Although a lower limit of the content is not particularly limited, about 0.001% is a substantial lower limit from a practical standpoint.

(Al: 0.001 to 1.00%)

Al is an element which is added for the purpose of deoxidation. If a content of Al is less than 0.001%, an effect of addition is not exhibited, so that the content is set to 0.001% or more. The content is preferably 0.010% or more. On the other hand, if the content exceeds 1.00%, the effect of addition is saturated and a cost is increased, and besides, a transformation temperature of the steel is raised to increase a load at a time of performing hot rolling, so that the content is set to 1.00% or less. The content is preferably 0.50% or less, and more preferably 0.20% or less.

(Ti: 0.001 to 0.10%)

Ti is an element which functions to fix N by forming TiN in the steel and to suppress generation of BN to be a factor of reducing the hardenability, and contributes to improvement of the toughness and the hydrogen embrittlement resistance by making an austenite grain diameter at the time of heating to be very small. If a content of Ti is less than 0.001%, an effect of addition is not exhibited, so that the content is set to 0.001% or more. The content is preferably 0.010% or more. On the other hand, if the content exceeds 0.10%, a coarse Ti carbide is generated, which reduces the toughness and the hydrogen embrittlement resistance of the steel sheet, so that the content is set to 0.10% or less. The content is preferably 0.07% or less.

(B: 0.0001 to 0.01%)

B is an element which functions to enhance the hardenability of the steel by segregating in an austenite grain boundary at the time of heating the steel sheet to stabilize the austenite grain boundary, and contributes to improvement of the toughness and the hydrogen embrittlement resistance of the steel sheet by increasing the grain boundary strength. If a content of B is less than 0.0001%, an effect of addition is not exhibited, so that the content is set to 0.0001% or more. The content is preferably 0.0006% or more, and more preferably 0.0011% or more.

On the other hand, if the content exceeds 0.01%, a boride is generated to inhibit the hardenability of the steel, so that the content is set to 0.01% or less. The content is preferably 0.005% or less, and more preferably 0.004% or less.

Mo, Cr, Ni, Cu, V, Nb, Ca, Mg, and REM are not essential elements, but are optional elements which may be appropriately contained, up to a predetermined amount as a limit, in the steel sheet and the steel.

(Mo: 0 to 0.50%)

Mo is an element which contributes to improvement of the hardenability of the steel sheet, and contributes to formation of a required structure by delaying a bainite transformation which occurs from cooling after heating in an annealing process to the middle of immersion plating. Further, Mo is an element which contributes to improvement of the toughness and the hydrogen embrittlement resistance by making a grain diameter of austenite during heating to be very small. Therefore, Mo may be contained. If a content of Mo is less than 0.001%, an effect of addition is not exhibited, so that the Mo content is preferably 0.001% or more, and more preferably 0.050% or more. On the other hand, if the Mo content exceeds 0.50%, the effect of addition is saturated and a manufacturing cost is increased, so that the Mo content is 0.50% or less, and preferably 0.30% or less. Specifically, it is preferable that "Mo: 0.001 to 0.50%" is satisfied.

(Cr: 0 to 0.80%, Ni: 0 to 1.00%, Cu: 0 to 1.00%)

Each of Cr, Ni, and Cu is an element which is effective for realizing high strengthening of the steel sheet. Therefore, Cr, Ni, or Cu, or any combination thereof may be contained. If a content of each of Cr, Ni, and Cu is less than 0.001%, an effect of addition is not exhibited, so that the content of each of the elements is preferably 0.001% or more, and more preferably 0.010% or more. On the other hand, if the Cr content exceeds 0.80%, when the Ni content exceeds 1.00%, or when the Cu content exceeds 1.00%, the effect of addition is saturated, and besides, a manufacturing cost is increased. Therefore, the Cr content is set to 0.80% or less, the Ni content is set to 1.00% or less, the Cu content is set to 1.00% or less, and it is preferable that the Cr content is 0.50% or less, the Ni content is 0.50% or less, and the Cu content is 0.50% or less. Specifically, "Cr: 0.001 to 0.80%", "Ni: 0.001 to 1.00%", or "Cu: 0.001 to 1.00%", or any combination thereof is preferably satisfied.

(V: 0 to 0.50%, Nb: 0.0 to 0.10%)

V and Nb are elements which form carbides to contribute to the high strengthening of the steel sheet. Therefore, V or Nb, or both thereof may be contained. If a content of each of the elements is less than 0.001%, an effect of addition is not exhibited, so that each of the V content and the Nb content is preferably set to 0.001% or more, and it is more preferable that the V content is 0.030% or more, and the Nb content is 0.005% or more. On the other hand, if the V content exceeds 0.50%, or when the Nb content exceeds 0.10%, the effect of addition is saturated, and besides, a cost is increased, so that the V content is set to 0.50% or less, the Nb content is set to 0.10% or less, and it is preferable that the V content is 0.30% or less, and the Nb content is 0.05% or less. Specifically, "V: 0.001 to 0.50%", or "Nb: 0.001 to 0.10%", or both thereof are preferably satisfied.

(Ca: 0.00 to 0.01%, Mg: 0.00 to 0.01%, REM: 0.00 to 0.01%, Bi: 0.00 to 0.01%)

Ca, Mg, and REM contribute to fine dispersion of inclusions in the steel. Further, Bi reduces microsegregation of substitutional alloying elements such as Mn and Si in the steel. Each thereof is an element which contributes to improvement of the toughness and the workability of the steel sheet. Therefore, Ca, Mg, REM, or Bi, or any combination thereof may be contained. If a content of each of the elements is less than 0.0001%, an effect of addition is not exhibited, so that the content of each of the elements is preferably 0.0001% or more, and more preferably 0.0010% or more. On the other hand, if the content of each of the elements exceeds 0.01%, ductility is inhibited, so that the content of each of the elements is set to 0.01% or less, and is preferably 0.005% or less. Specifically, "Ca: 0.0001 to 0.01%", "Mg: 0.0001 to 0.01%", "REM: 0.0001 to 0.01%", or "Bi: 0.0001 to 0.01%", or any combination thereof is preferably satisfied.

Next, the reasons for limiting the steel structure of the hot-dip galvanized steel sheet according to the embodiment of the present invention will be described. In the description hereinbelow, "%" being a unit of ratio of a phase or a structure constituting the steel structure means an area ratio (%) in any cross section unless otherwise noted. The hot-dip galvanized steel sheet according to the embodiment of the present invention has a steel structure represented by: in terms of area ratio, polygonal ferrite: 10% or less; upper bainite: 20% or less; retained austenite: 5% or less; and martensite: 70% or more, in which martensite having Fe carbides at a number density of $1 \times 10^6/mm^2$ or more is contained by 50% or more with respect to the entire amount of martensite, and the steel structure has an average effective crystal grain diameter of 5.0 μm or less.

(Polygonal ferrite: 10% or less, upper bainite: 20% or less)

If the polygonal ferrite exceeds 10%, or the upper bainite exceeds 20%, the steel sheet is softened and it becomes difficult to obtain a yield ratio of 75% or more, so that the polygonal ferrite is set to 10% or less, and the upper bainite is set to 20% or less. It is preferable that the polygonal ferrite is 5% or less, and the upper bainite is 10% or less.

(Retained austenite: 5% or less)

If the retained austenite exceeds 5%, fresh martensite transformed from the retained austenite due to strain-induced transformation after press forming exerts influence on hydrogen embrittlement, and it becomes difficult to obtain the excellent hydrogen embrittlement resistance, so that the retained austenite is set to 5% or less. The retained austenite is preferably 2% or less.

(Martensite: 70% or more)

If the martensite is less than 70%, the desired strength cannot be secured, so that it is set to 70% or more. The martensite is preferably 80% or more.

The calculation of the area ratio of the steel structure is performed as follows. Regarding the area ratio of each of polygonal ferrite, upper bainite, pearlite, cementite, martensite, and tempered martensite, a cross section in a rolling direction of the steel sheet is cut, a nital solution is used to make a steel structure appear, a ⅛ to ⅜ thickness position in the appeared steel structure is photographed with a scanning electron microscope (5000 magnifications, 10 visual fields), and an average value calculated from the obtained photograph of structure through a point counting method, is set to the area ratio.

Regarding the area ratio of the retained austenite, X-ray diffraction is performed by setting a surface at a ¼ thickness of the steel sheet to an observation surface, and a value calculated from a peak area ratio of bcc and fcc is set to the area ratio.

(Martensite having Fe carbides at a number density of $1 \times 10^6/mm^2$ or more: 50% or more with respect to the entire amount of martensite)

In order to realize both of the yield ratio of 75% or more and the excellent hydrogen embrittlement resistance, out of the martensite contained in the steel structure, a region of 50% or more in terms of area ratio is set to martensite having Fe carbides at a number density of $1.0 \times 10^6/mm^2$ or more.

If the martensite having Fe carbides at a number density of $1.0 \times 10^6/mm^2$ or more is less than 50% with respect to the entire amount of martensite, it is difficult to obtain the yield ratio of 75% or more, so that the martensite having Fe carbides at a number density of $1.0 \times 10^6/mm^2$ or more is set to 50% or more, and is preferably 65% or more. Further, if the number density of Fe carbides is less than $1.0 \times 10^6/mm^2$, it is not possible to obtain the excellent hydrogen embrittlement resistance, so that the number density of Fe carbides is set to $1.0 \times 10^6/mm^2$ or more. The number density is preferably $5.0 \times 10^6/mm^2$ or more.

Regarding the number density of Fe carbides that exist in martensite, a cross section in a rolling direction of the steel sheet is cut, a nital solution is used to make a steel structure appear, a ⅛ to ⅜ thickness position in the appeared steel structure is photographed with a scanning electron microscope (5000 magnifications, 10 visual fields), and the number of Fe carbides is measured in the obtained photograph of structure, to thereby calculate the number density.

(Average effective crystal grain diameter: 5.0 μm or less)

An effective crystal grain diameter means a size (grain diameter) of a region surrounded by a grain boundary with a crystal misorientation of 10° or more (which will be described later). For example, in martensite, the effective crystal grain diameter corresponds to a block grain diameter.

In order to obtain the excellent hydrogen embrittlement resistance, the average effective crystal grain diameter is set to 5.0 μm or less. If the average effective crystal grain diameter exceeds 5.0 μm, a grain boundary area of a high-angle grain boundary is reduced to lower the hydrogen embrittlement resistance, so that the average effective crystal grain diameter is set to 5.0 μm or less. The average effective crystal grain diameter is preferably 4.0 μm or less.

The average effective crystal grain diameter is measured by an electron back scatter diffraction pattern-orientation image microscopy (EBSP-OIM) method. In the EBSP-OIM method, an electron beam is irradiated to a sample which is highly inclined in a scanning electron microscope (SEM), and a Kikuchi pattern formed by backscattering is photographed with a high-sensitive camera. Subsequently, a crystal orientation of an irradiation point is measured in a short period of time through image processing with a computer. Further, it is possible to analyze a measured value by using software.

In the EBSP-OIM method, it is possible to quantitatively analyze the microstructure and the crystal orientation of the steel structure. Although a resolution in the EBSP-OIM method depends on a resolution of SEM, it is possible to perform analysis with a resolution of 20 nm at the minimum. In the present invention, in order to recognize a block boundary which may become an effective crystal grain boundary, a crystal grain boundary of steel is defined by a threshold of 10°, crystal grains are visualized in an image in which crystal grain boundaries with a misorientation of 10° or more are mapped, and an average crystal grain diameter is determined.

(Average dislocation density of entire steel: $1.0 \times 10^{15}/m^2$ to $1.0 \times 10^{16}/m^2$)

In order to realize both of a tensile strength of 1300 MPa or more and the excellent hydrogen embrittlement resistance, an average dislocation density of the entire steel is preferably set to $1.0 \times 10^{15}/m^2$ to $1.0 \times 10^{16}/m^2$. The dislocation contributes to strengthening of the material, so that an amount thereof is preferably large from a viewpoint of high strengthening, but, the amount is preferably small from a viewpoint of hydrogen embrittlement resistance. If the average dislocation density is less than $1.0 \times 10^{15}/m^2$, it is not possible to obtain the tensile strength of 1300 MPa or more, so that it is preferably set to $1.0 \times 10^{15}/m^2$ or more, and is more preferably $5.0 \times 10^{15}/m^2$ or more.

On the other hand, if the average dislocation density exceeds $1.0 \times 10^{16}/m^2$, the hydrogen embrittlement resistance deteriorates because an amount of hydrogen entering into the steel material is increased by an interaction between the dislocation in the steel and hydrogen, so that the average dislocation density is preferably set to $1.0 \times 10^{16}/m^2$ or less, and is more preferably $0.5 \times 10^{16}/m^2$ or less.

Regarding the average dislocation density of the entire steel, an average dislocation density is calculated from a half-width of $(110)\alpha$, $(211)\alpha$, and $(220)\alpha$, based on a method described in "evaluation method of dislocation density utilizing X-ray diffraction" in Non-Patent Literature "CAMP-ISIJ Vol. 17 (2004) p. 396".

With the use of the hot-dip galvanized steel sheet according to the embodiment of the present invention configured as above, it is possible to obtain, for example, the tensile strength of 1300 MPa or more, the yield ratio of 75% or more, and the excellent hydrogen embrittlement resistance. If the tensile strength is less than 1300 MPa, it is sometimes difficult to secure the reduction in weight and the collision safety, so that it is preferable that the tensile strength of 1300 MPa or more can be obtained, and it is more preferable that the tensile strength of 1350 MPa or more can be obtained. If the yield ratio is less than 75%, it is sometimes difficult to secure the collision safety, so that it is preferable that the yield ratio of 75% or more can be obtained, and it is preferable that the yield ratio of 80% or more can be obtained.

An amount of solid-solution B is preferably 0.0010 mass % or more, and a prior austenite grain diameter is preferably 1.0 μm to 7.0 μm. The solid-solution B contributes to improvement of the toughness and the hydrogen embrittlement resistance of the steel sheet by increasing the grain boundary strength of prior austenite grains. However, if the amount of solid-solution B is less than 0.0010 mass %, it is sometimes not possible to obtain sufficient toughness and hydrogen embrittlement resistance. Therefore, the amount of solid-solution B is preferably set to 0.0010 mass % or more, and more preferably set to 0.0015 mass % or more. Further, if the prior austenite grain diameter is less than 1.0 μm, there is a case where a grain boundary area of the prior austenite grain is excessively large and the grain boundary strength is not sufficiently improved by solid-solution B. Therefore, the prior austenite grain diameter is preferably set to 1.0 μm or more, and is preferably 2.0 μm or more. On the other hand, if the prior austenite grain diameter exceeds 7.0 μm, the toughness of the material deteriorates, so that the hydrogen embrittlement resistance deteriorates as well. Therefore, the prior austenite grain diameter is preferably set to 7.0 μm or less.

The amount of solid-solution B can be calculated by subtracting a mass of B contained in a precipitate such as a boride from a total mass of B contained in the hot-dip galvanized steel sheet. The mass of B contained in the precipitate can be obtained in a manner that a mass of a B precipitate is measured through an extraction residue method, and the mass is converted into a mass of B contained in the B precipitate. The quantification method of the B precipitate through the extraction residue method is described in Non-Patent Literature 2, for example. Regarding the prior austenite grain diameter, a cross section in a rolling direction of the steel sheet is cut, a picric acid alcohol solution is used to make a prior austenite grain boundary appear, a ⅛ to ⅜ thickness position in the appeared prior austenite grain boundary is photographed with a scanning electron microscope (1000 magnifications, 5 visual fields), and an average value calculated through a segment method from the obtained photograph of structure is used as the prior austenite grain diameter.

It is preferable that a product of the amount of solid-solution B and the prior austenite grain diameter is 0.0010 mass %·μm or more. The smaller the prior austenite grain diameter, the larger the grain boundary area of the prior austenite grain. For this reason, in order to obtain a certain grain boundary strength, as the prior austenite grain diameter becomes smaller, a larger amount of solid-solution B is required. When the present inventors conducted examination based on such a viewpoint, it was clarified that particularly excellent hydrogen embrittlement resistance can be obtained when the product of the amount of solid-solution B and the prior austenite grain diameter is 0.0010 mass %·μm or more.

Next, a manufacturing method of the hot-dip galvanized steel sheet according to the embodiment of the present invention will be described. In this manufacturing method, hot rolling of a slab having the above-described chemical composition, cold rolling, continuous annealing, a hot-dip galvanizing treatment, an alloying treatment, and tempering are conducted in this order.

In the hot rolling, slab heating, rough rolling, finish rolling, and cooling are performed.

A slab heating temperature is set to 1180° C. or more. If the slab heating temperature is less than 1180° C., it is not possible to sufficiently dissolve a boron compound in the slab, and thus it is not possible to secure a sufficient amount of solid-solution boron. As the slab, it is possible to use, for example, a slab obtained by continuous casting, a slab produced by an ingot making method, or a slab cast by a thin slab casting method. The slab may be subjected, after being cast, to a hot-rolling facility while a temperature thereof is kept to 1180° C. or more, and it may also be subjected to the hot-rolling facility after it is cooled to a temperature of less than 1180° C., for example, a room temperature, and then heated.

In the rough rolling, a temperature is set to not less than 1050° C. nor more than 1150° C., and a total reduction ratio is set to 50% or more. This is for sufficiently causing recrystallization during the hot rolling to homogenize a structure of a hot-rolled steel sheet.

In the finish rolling, a total reduction ratio from a first pass which is carried out at a temperature of 1050° C. or less to a second last pass is set to not less than 60% nor more than 95%, a rolling ratio of a final pass is set to not less than 5% nor more than 30%, and a temperature of the final pass is set to not less than 880° C. nor more than 980° C. If the total reduction ratio from the first pass which is carried out at the temperature of 1050° C. or less to the second last pass exceeds 95%, or the rolling ratio of the final pass exceeds 30%, the precipitation of a boride is facilitated during the finish rolling, resulting in that a sufficient amount of solid-solution boron cannot be secured. Also when the temperature of the final pass is less than 880° C., the precipitation of a boride is facilitated during the finish rolling, resulting in that a sufficient amount of solid-solution boron cannot be secured. If the total reduction ratio from the first pass which is carried out at the temperature of 1050° C. or less to the second last pass is less than 60%, or the rolling ratio of the final pass is less than 10%, the structure of the hot-rolled steel sheet becomes coarse, and it is not possible to obtain the desired effective crystal grain diameter.

The cooling is performed after a lapse of 1 second or more from the termination of the finish rolling, in which cooling is performed to a temperature of not less than 450° C. nor more than 700° C. at a cooling rate of not less than 5° C./second nor more than 50° C./second, and coiling is performed at that temperature. If the cooling is started before the lapse of 1 second or more from the termination of the finish rolling, austenite is not sufficiently recrystallized, and anisotropy becomes obvious. If the cooling rate is less than 5° C./second, the ferrite transformation in a high-temperature region is facilitated, which makes the structure of the hot-rolled steel sheet to be coarse, resulting in that the desired effective crystal grain diameter cannot be obtained. Although an upper limit of the cooling rate is not particularly set, it is practically difficult to set the cooling rate to 50° C./second or more. If the coiling temperature exceeds 700° C., there is a case where the structure of the hot-rolled steel sheet becomes coarse and the desired effective crystal grain diameter cannot be obtained, or the precipitation of a boride is facilitated and a sufficient amount of solid-solution boron cannot be secured. If the coiling temperature is less than 450° C., the strength of the hot-rolled steel sheet becomes excessive, and it becomes difficult to perform the cold rolling to be conducted thereafter. The coiling temperature is preferably set to not less than 500° C. nor more than 650° C.

After the coiling, pickling of the hot-rolled steel sheet is performed according to a common procedure. It is also possible to perform skin pass rolling on the hot-rolled steel sheet. By performing the skin pass rolling, it is possible to correct a shape or improve picklability.

In the cold rolling, a reduction ratio is set to not less than 20% nor more than 80%. If the reduction ratio is less than 20%, it is not possible to obtain fine austenite grains in the annealing. On the other hand, if the reduction ratio exceeds 80%, a rolling weight becomes excessive to cause increase in a load of a cold-rolling mill. The reduction ratio is preferably set to not less than 30% nor more than 70%.

In the continuous annealing, temperature-raising, retention, and cooling are performed.

In the temperature-raising, an average heating rate in a temperature region of not less than 700° C. nor more than $Ac_3$ point is set to not less than 0.1° C./second nor more than 10° C./second. By setting this average heating rate to 10° C./second or less, it is possible to facilitate the segregation of the boron element into the austenite grain boundary. On the other hand, if this average heating rate is less than 0.1° C./second, it takes a long time to heat the steel sheet, which impairs productivity, so that this is set to a practical lower limit.

After performing the temperature-raising, the retention is performed in a temperature region of not less than $Ac_3$ point nor more than 900° C. for not less than 1 second nor more than 500 seconds. If the retention temperature is less than the $Ac_3$ point or if the retention time is less than 1 second, it is not possible to cause sufficient austenitizing. On the other hand, if the retention temperature exceeds 900° C., the austenite grains become coarse and the effective crystal grain diameter becomes excessively large, which makes the hydrogen embrittlement resistance deteriorate. If the retention time exceeds 500 seconds, the productivity is impaired.

After performing the retention, the cooling is performed from the retention temperature to a temperature of not less than 450° C. nor more than 600° C. An average cooling rate from the retention temperature to 650° C. is set to 0.5° C./second or more. If this average cooling rate is less than 0.5° C./second, there is a case where the ferrite transformation excessively progresses, and the area ratio of polygonal ferrite exceeds 10%. The average cooling rate from 650° C. to the temperature of not less than 450° C. nor more than 650° C. is set to 3° C./second or more. If this average cooling rate is less than 3° C./second, there is a case where the ferrite transformation excessively progresses, and the area ratio of polygonal ferrite exceeds 10%. If the cooling is continued to a temperature of less than 450° C. at the average cooling rate of 3° C./second or more, there is a case where the generation of upper bainite is facilitated, and the area ratio of upper bainite exceeds 20%. The cooling at the average cooling rate of 3° C./second or more is preferably stopped at 470° C. or more. If the cooling at the average cooling rate of 3° C./second or more is stopped at a temperature exceeding 600° C., there is a case where the generation of ferrite is facilitated thereafter, and the area ratio of ferrite exceeds 10%. The average cooling rate from the retention temperature to the temperature of not less than 450° C. nor more than 600° C. may also be set to 3° C./second or more.

In the hot-dip galvanizing treatment, retention and immersion into a plating bath are performed.

The retention is started from the cooling at the average cooling rate of 3° C./second or more in the continuous annealing, a retention temperature is set to not less than 450° C. nor more than 600° C., and a retention time is set to not less than 1 second nor more than 1000 seconds. If the retention temperature is less than 450° C., the generation of upper bainite is facilitated, and if the retention temperature exceeds 600° C., the generation of ferrite is facilitated. If the retention time exceeds 1000 seconds, the upper bainite is excessively generated. The retention time is preferably set to 500 seconds or less, and more preferably set to 100 seconds or less. It is difficult to set the retention time to less than 1 second in terms of actual operation.

The plating bath may contain impurities such as Fe, Si, Al, Mg, Mn, Cr, Ti, and Pb. For example, a temperature of the plating bath is set to not less than 420° C. nor more than 500° C., an entering sheet temperature of the steel sheet is set to not less than 420° C. nor more than 500° C., an immersion time is set to 5 seconds or less, and a weight amount is set to not less than 25 g/m$^2$ nor more than 75 g/m$^2$ per one side. The weight amount can be controlled by a publicly-known method such as gas wiping, for example.

In the alloying treatment, control of a treatment temperature and cooling are performed.

A treatment temperature in the alloying treatment is set to not less than 480° C. nor more than 600° C. If the temperature of the steel sheet after being subjected to the immersion into the plating bath is less than 480° C., the steel sheet is heated to a temperature of not less than 480° C. nor more than 600° C. If the treatment temperature is less than 480° C., a speed of progress of the alloying is slow, which sometimes impairs the productivity or causes unevenness of the alloying. The treatment temperature is preferably set to 500° C. or more. On the other hand, if the treatment temperature exceeds 600° C., the alloying excessively progresses to make a powdering property of the steel sheet deteriorate. The treatment temperature is preferably set to 580° C. or less.

After that, the cooling is performed from the treatment temperature in the alloying treatment to a temperature of (Ms point −80° C.) or less. An average cooling rate in this cooling is set to 5° C./second or more. If the average cooling rate is less than 5° C./second, there is a case where bainite is excessively generated, and it becomes difficult to obtain a desired microstructure. If the cooling at the average cooling rate of 5° C./second or more is stopped at a temperature exceeding (Ms point −80° C.), a generation amount of martensite becomes insufficient, and an amount of martensite having Fe carbides at a number density of 1×10$^6$/mm$^2$ or more becomes insufficient. The temperature of stopping the cooling at the average cooling rate of 5° C./second or more is preferably set to (Ms point −120°) C. or less.

In the tempering, retention is performed in a temperature region of not less than 200° C. nor more than 400° C. for not less than 5 seconds nor more than 500 seconds. If the retention temperature is less than 200° C. or the retention time is less than 5 seconds, the tempering is not sufficiently performed, resulting in that an amount of martensite having Fe carbides at a number density of 1×10$^6$/mm$^2$ or more sometimes becomes less than 50% with respect to the entire amount of martensite, or the average dislocation density sometimes becomes greater than 1.0×10$^6$/m$^2$. The retention temperature is preferably set to 220° C. or more. On the other hand, if the retention temperature exceeds 400° C. or the retention time exceeds 500 seconds, the tempering is excessively performed, resulting in that a sufficient tensile strength cannot be obtained. The retention temperature is preferably set to 350° C. or less. The tempering may be carried out as a series of heat treatment in a line of hot-dip galvanizing, or it may also be performed as a heat treatment using a heat treatment apparatus after performing the hot-dip galvanizing treatment and then performing the coiling at the room temperature.

When the temperature of stopping the cooling at the average cooling rate of 5° C./second or more in the alloying treatment is not less than 200° C. nor more than 400° C., it is also possible to perform retention, while keeping that state, in the temperature region of not less than 200° C. nor more than 400° C. for not less than 5 seconds nor more than 500 seconds. When the temperature of stopping the cooling at the average cooling rate of 5° C./second or more in the alloying treatment is less than 200° C., the steel sheet is heated to a temperature of not less than 200° C. nor more than 400° C. A heating rate at this time is preferably set to 1° C./second or more from a viewpoint of productivity.

The alloying treatment may also be omitted. In this case, the steel sheet discharged from the plating bath is cooled to the temperature of (Ms point −80° C.) or less at the average cooling rate of 5° C./second or more, and then subjected to the tempering in which the steel sheet is retained in the temperature region of not less than 200° C. nor more than 400° C. for not less than 5 seconds nor more than 500 seconds. If the temperature at which the steel sheet is discharged from the plating bath is not less than 200° C. nor more than 360° C. when the alloying treatment is omitted, the steel sheet may be retained, in that state, in a temperature region of not less than 200° C. nor more than 400° C. for not less than 5 seconds nor more than 500 seconds for performing the tempering. When the temperature at which the steel sheet is discharged from the plating bath is less than 200° C., the steel sheet is heated to a temperature of not less than 200° C. nor more than 400° C. for performing the tempering. A heating rate at this time is preferably set to 1° C./second or more from a viewpoint of productivity.

It is also possible to perform temper rolling after the hot-dip galvanizing treatment. By the temper rolling, for example, a flatness of the steel sheet can be corrected or a surface roughness can be adjusted. An elongation percentage obtained by the temper rolling is preferably set to 2% or less in order to avoid deterioration of the ductility.

EXAMPLES

Next, examples of the present invention will be described. A condition in the examples is a case of condition adopted to confirm feasibility and an effect of the present invention, and the present invention is not limited to this case of the condition. In the present invention, it is possible to adopt various conditions as long as the object of the present invention is achieved without departing from the gist of the present invention.

Example 1

Steels having chemical compositions presented in Table 1 were smelted to obtain cast slabs, and the cast slabs were subjected to hot rolling under hot-rolling conditions presented in Table 2 to obtain hot-rolled steel sheets each having a thickness of 3 mm. The hot-rolled steel sheets were subjected to pickling, and then subjected to cold rolling under cold-rolling conditions (at reduction ratios) presented in Table 2 to obtain cold-rolled steel sheets each having a thickness of 1.2 mm. A blank column in Table 1 indicates that a content of the element corresponding to the column was less than a detection limit, and the balance is composed of Fe and impurities. An underline in Table 1 indicates that the underlined numeric value is out of the range of the present invention.

TABLE 1

| STEEL TYPE | CHEMICAL COMPOSITION (mass %) |  |  |  |  |  |  |  |  |  |  |  |  |  |
|---|---|---|---|---|---|---|---|---|---|---|---|---|---|---|
|  | C | Si | Mn | P | S | Cu | Cr | Ni | Mo | V | Al | Ti | Nb | B |
| A | 0.172 | 0.05 | 2.70 | 0.010 | 0.0019 |  |  |  |  |  | 0.023 | 0.030 |  | 0.0021 |
| B | 0.180 | 0.75 | 2.60 | 0.009 | 0.0020 |  |  |  |  |  | 0.020 | 0.028 |  | 0.0019 |
| C | 0.177 | 1.85 | 2.65 | 0.009 | 0.0020 |  |  |  |  |  | 0.020 | 0.030 |  | 0.0020 |
| D | 0.189 | 0.45 | 2.65 | 0.010 | 0.0016 |  |  |  | 0.065 |  | 0.028 | 0.030 |  | 0.0017 |
| E | 0.161 | 0.04 | 2.70 | 0.011 | 0.0020 |  |  |  | 0.095 |  | 0.026 | 0.030 |  | 0.0022 |
| F | 0.187 | 0.03 | 2.34 | 0.009 | 0.0019 |  |  |  | 0.102 |  | 0.024 | 0.030 |  | 0.0020 |
| G | 0.195 | 0.03 | 2.71 | 0.009 | 0.0018 |  |  |  |  |  | 0.020 | 0.028 |  | 0.0019 |
| H | 0.189 | 0.02 | 2.70 | 0.010 | 0.0021 |  |  |  | 0.099 |  | 0.020 | 0.027 |  | 0.0017 |
| I | 0.191 | 0.02 | 2.67 | 0.012 | 0.0015 |  |  |  | 0.099 |  | 0.020 | 0.027 |  | 0.0008 |
| J | 0.185 | 0.05 | 2.72 | 0.010 | 0.0020 |  |  |  | 0.055 |  | 0.030 | 0.030 |  | 0.0021 |
| K | 0.170 | 0.03 | 2.74 | 0.011 | 0.0034 |  |  |  | 0.058 | 0.120 | 0.020 | 0.025 |  | 0.0021 |
| L | 0.190 | 0.02 | 2.66 | 0.008 | 0.0021 |  |  |  | 0.097 | 0.050 | 0.029 | 0.027 |  | 0.0019 |
| M | 0.184 | 0.02 | 2.70 | 0.009 | 0.0021 |  |  |  | 0.110 |  | 0.020 | 0.027 |  | 0.0020 |
| N | 0.190 | 0.01 | 2.71 | 0.010 | 0.0017 |  |  |  | 0.100 |  | 0.020 | 0.028 | 0.025 | 0.0019 |
| O | 0.201 | 0.02 | 2.68 | 0.008 | 0.0016 |  |  |  |  |  | 0.027 | 0.030 | 0.027 | 0.0020 |
| P | 0.166 | 0.02 | 2.69 | 0.011 | 0.0021 | 0.200 |  |  | 0.099 |  | 0.020 | 0.027 |  | 0.0019 |
| Q | 0.174 | 0.04 | 2.67 | 0.013 | 0.0025 |  | 0.200 |  | 0.088 |  | 0.029 | 0.031 |  | 0.0022 |
| R | 0.157 | 0.02 | 2.73 | 0.009 | 0.0021 |  |  | 0.200 | 0.087 |  | 0.025 | 0.033 |  | 0.0018 |
| S | 0.186 | 0.03 | 2.71 | 0.010 | 0.0022 |  |  |  | 0.099 |  | 0.019 | 0.027 |  | 0.0019 |
| T | 0.188 | 0.02 | 2.73 | 0.007 | 0.0016 |  |  |  | 0.096 |  | 0.018 | 0.028 |  | 0.0020 |
| U | 0.190 | 0.02 | 2.70 | 0.012 | 0.0021 |  |  |  | 0.101 |  | 0.023 | 0.028 |  | 0.0018 |
| V | 0.184 | 0.01 | 2.68 | 0.013 | 0.0029 |  |  |  | 0.099 |  | 0.020 | 0.030 |  | 0.0021 |
| W | 0.187 | 0.02 | 2.72 | 0.010 | 0.0030 |  |  |  | 0.105 |  | 0.020 | 0.026 |  | 0.0022 |
| X | 0.191 | 0.02 | 2.70 | 0.007 | 0.0018 |  |  |  | 0.094 |  | 0.027 | 0.031 |  | 0.0020 |
| Y | 0.190 | 0.01 | 2.69 | 0.010 | 0.0015 |  |  |  | 0.096 |  | 0.028 | 0.033 |  | 0.0019 |
| Z | 0.204 | 0.02 | <u>1.75</u> | 0.010 | 0.0022 |  |  |  | 0.103 |  | 0.028 | 0.027 |  | 0.0019 |
| AA | <u>0.102</u> | 0.02 | 2.70 | 0.011 | 0.0020 |  |  |  | 0.099 |  | 0.020 | 0.029 |  | 0.0020 |
| AB | <u>0.360</u> | 0.03 | 2.65 | 0.007 | 0.0021 |  |  |  | 0.100 |  | 0.029 | 0.028 |  | 0.0017 |
| AC | 0.183 | 0.02 | 2.66 | 0.008 | 0.0015 |  |  |  | 0.102 |  | 0.020 | LESS THAN DETECTION LIMIT |  | 0.0018 |
| AD | 0.190 | 0.01 | 2.70 | 0.010 | 0.0021 |  |  |  | 0.099 |  | 0.019 | 0.034 |  | LESS THAN DETECTION LIMIT |
| AE | 0.176 | 0.03 | <u>4.20</u> | 0.011 | 0.0024 |  |  |  | 0.090 |  | 0.023 | 0.030 |  | 0.0021 |
| AF | 0.190 | 0.02 | 2.71 | 0.011 | 0.0026 |  |  |  | 0.099 |  | 0.020 | 0.031 |  | <u>0.0200</u> |
| AG | 0.193 | <u>2.34</u> | 2.48 | 0.013 | 0.0031 |  |  |  | 0.057 |  | 0.026 | 0.029 |  | 0.0028 |
| AH | 0.199 | 0.05 | 2.72 | 0.011 | 0.0032 |  |  |  | 0.099 |  | 0.021 | <u>0.120</u> |  | 0.0022 |

| STEEL TYPE | CHEMICAL COMPOSITION (mass %) |  |  |  |  |  |  |  | M's (° C.) | REMARKS |
|---|---|---|---|---|---|---|---|---|---|---|
|  | Ca | Mg | Bi | Ce | Zr | Hf | REM | N |  |  |
| A |  |  |  |  |  |  |  | 0.0034 | 383 | INVENTION EXAMPLE |
| B |  |  |  |  |  |  |  | 0.0038 | 384 | INVENTION EXAMPLE |
| C |  |  |  |  |  |  |  | 0.0039 | 383 | INVENTION EXAMPLE |
| D |  |  |  |  |  |  |  | 0.0030 | 379 | INVENTION EXAMPLE |
| E |  |  |  |  |  |  |  | 0.0033 | 387 | INVENTION EXAMPLE |
| F |  |  |  |  |  |  |  | 0.0029 | 391 | INVENTION EXAMPLE |
| G |  |  |  |  |  |  |  | 0.0035 | 375 | INVENTION EXAMPLE |
| H |  |  |  |  |  |  |  | 0.0030 | 377 | INVENTION EXAMPLE |
| I |  |  |  |  |  |  |  | 0.0030 | 377 | INVENTION EXAMPLE |
| J |  |  |  |  |  |  |  | 0.0035 | 377 | INVENTION EXAMPLE |
| K |  |  |  |  |  |  |  | 0.0034 | 378 | INVENTION EXAMPLE |
| L |  |  |  |  |  |  |  | 0.0035 | 376 | INVENTION EXAMPLE |
| M |  |  |  |  |  |  |  | 0.0030 | 375 | INVENTION EXAMPLE |
| N |  |  |  |  |  |  |  | 0.0039 | 376 | INVENTION EXAMPLE |
| O |  |  |  |  |  |  |  | 0.0034 | 374 | INVENTION EXAMPLE |
| P |  |  |  |  |  |  |  | 0.0033 | 383 | INVENTION EXAMPLE |
| Q |  |  |  |  |  |  |  | 0.0036 | 379 | INVENTION EXAMPLE |
| R |  |  |  |  |  |  |  | 0.0034 | 384 | INVENTION EXAMPLE |
| S | 0.0036 |  |  |  |  |  |  | 0.0030 | 377 | INVENTION EXAMPLE |
| T |  | 0.0035 |  |  |  |  |  | 0.0037 | 376 | INVENTION EXAMPLE |
| U |  |  | 0.0044 |  |  |  |  | 0.0035 | 376 | INVENTION EXAMPLE |

TABLE 1-continued

| | | | | | | | |
|---|---|---|---|---|---|---|---|
| V | 0.0042 | | | | 0.0035 | 379 | INVENTION EXAMPLE |
| W | | 0.0022 | | | 0.0032 | 376 | INVENTION EXAMPLE |
| X | | | 0.0024 | | 0.0029 | 376 | INVENTION EXAMPLE |
| Y | | | | 0.0033 | 0.0030 | 377 | INVENTION EXAMPLE |
| Z | | | | | 0.0028 | 408 | COMPARATIVE EXAMPLE |
| AA | | | | | 0.0028 | 408 | COMPARATIVE EXAMPLE |
| AB | | | | | 0.0035 | 317 | COMPARATIVE EXAMPLE |
| AC | | | | | 0.0030 | 380 | COMPARATIVE EXAMPLE |
| AD | | | | | 0.0035 | 376 | COMPARATIVE EXAMPLE |
| AE | | | | | 0.0035 | 323 | COMPARATIVE EXAMPLE |
| AF | | | | | 0.0030 | 376 | COMPARATIVE EXAMPLE |
| AG | | | | | 0.0032 | 372 | COMPARATIVE EXAMPLE |
| AH | | | | | 0.0028 | 367 | COMPARATIVE EXAMPLE |

TABLE 2

| | HOT ROLLING | | | | | | | | COLD ROLLING |
|---|---|---|---|---|---|---|---|---|---|
| | SLAB HEATING | ROUGH ROLLING TOTAL | FINISH ROLLING | | | | | | |
| CONDITION | TEMPERATURE (° C.) | REDUCTION RATIO (%) | REDUCTION RATIO R1 (%) | REDUCTION RATIO R2 (%) | TEMPERATURE FT (° C.) | Δt (s) | COOLING RATE (° C./s) | COILING TEMPERATURE (° C.) | REDUCTION RATIO (%) |
| a | 1250 | 85 | 90 | 18 | 900 | 1.6 | 10.0 | 550 | 50.0 |
| b | 1250 | 85 | 90 | 18 | 900 | 1.2 | 10.0 | 550 | 50.0 |
| c | 1250 | 85 | 90 | 18 | 900 | 1.3 | 10.0 | 550 | 50.0 |
| d | 1250 | 85 | 90 | 18 | 900 | 1.2 | 10.0 | 550 | 50.0 |
| e | 1250 | 85 | 90 | 18 | 900 | 1.4 | 10.0 | 550 | 50.0 |
| f | 1250 | 85 | 90 | 18 | 900 | 1.4 | 10.0 | 550 | 50.0 |
| g | 1250 | 85 | 90 | 18 | 900 | 1.2 | 10.0 | 550 | 50.0 |
| h | 1250 | 85 | 90 | 18 | 900 | 1.5 | 10.0 | 550 | 50.0 |
| i | 1250 | 85 | 90 | 18 | 900 | 1.6 | 10.0 | 550 | 50.0 |
| j | 1250 | 85 | 90 | 18 | 900 | 1.4 | 10.0 | 550 | 50.0 |
| k | 1250 | 85 | 90 | 18 | 900 | 1.3 | 10.0 | 550 | 50.0 |
| l | 1250 | 85 | 90 | 18 | 900 | 1.4 | 10.0 | 550 | 50.0 |
| m | 1250 | 85 | 90 | 18 | 900 | 1.2 | 10.0 | 550 | 50.0 |
| n | 1250 | 85 | 90 | 18 | 900 | 1.1 | 10.0 | 550 | 50.0 |
| o | 1250 | 85 | 90 | 18 | 900 | 1 | 10.0 | 550 | 50.0 |
| p | 1250 | 85 | 90 | 18 | 900 | 1.3 | 10.0 | 550 | 50.0 |
| q | 1250 | 85 | 90 | 18 | 900 | 1.2 | 10.0 | 550 | 50.0 |
| r | 1250 | 85 | 90 | 18 | 900 | 1.2 | 10.0 | 550 | 50.0 |
| s | 1250 | 85 | 90 | 18 | 900 | 1.5 | 10.0 | 550 | 50.0 |
| t | 1250 | 85 | 90 | 18 | 900 | 1.4 | 10.0 | 550 | 50.0 |
| u | 1250 | 85 | 90 | 18 | 900 | 1.2 | 10.0 | 550 | 50.0 |
| v | 1250 | 85 | 90 | 18 | 900 | 1.3 | 10.0 | 550 | 50.0 |
| w | 1250 | 85 | 90 | 18 | 900 | 1.2 | 10.0 | 550 | 50.0 |

R1: TOTAL REDUCTION RATIO FROM 1050° C. OR LESS TO POINT BEFORE FINISH FINAL PASS
R2: REDUCTION RATIO AT FINISH FINAL PASS
FT: TEMPERATURE AT FINISH FINAL PASS
Δt: LAPSED TIME FROM COMPLETION OF FINISH ROLLING TO START OF COOLING

The obtained cold-rolled steel sheets were subjected to a heat treatment under heat treatment conditions presented in FIG. 1 and Table 3, and then subjected to hot-dip galvanizing under plating conditions presented in FIG. 1 and Table 3. Besides, the alloying treatment, secondary cooling, reheating, and tertiary cooling were performed under conditions presented in FIG. 1 and Table 3, to thereby obtain alloyed hot-dip galvanized steel sheets.

TABLE 3

| CONDITION | CONTINUOUS ANNEALING ||||||| HOT-DIP GALVANIZING TREATMENT ||
| | HEATING RATE HR (° C./s) | PRIMARY RETENTION TEMPERATURE T1 (° C.) | PRIMARY RETENTION TIME t1 (s) | PRIMARY COOLING RATE CR1 (° C./s) | PRIMARY COOLING STOP TEMPERATURE T2 (° C.) | SECONDARY COOLING RATE CR2 (° C./s) | RETENTION TEMPERATURE T3 (° C.) | RETENTION TIME t2 (s) |
|---|---|---|---|---|---|---|---|---|
| a | 2.7 | 840 | 96 | 10.3 | 470 | 5 | 550 | 78 |
| b | 2.7 | 830 | 96 | 7.8 | 480 | 5 | 560 | 78 |
| c | 2.7 | 880 | 96 | 8.2 | 480 | 5 | 550 | 78 |
| d | 2.7 | 750 | 96 | 8.8 | 470 | 5 | 560 | 78 |
| e | 2.7 | 840 | 96 | 7.7 | 475 | 5 | 400 | 78 |
| f | 2.7 | 810 | 96 | 9.6 | 480 | 5 | 590 | 78 |
| g | 2.7 | 850 | 96 | 7.5 | 475 | 5 | 550 | 78 |
| h | 2.7 | 840 | 96 | 10.8 | 470 | 5 | 580 | 78 |
| i | 2.7 | 830 | 96 | 9.5 | 470 | 5 | 550 | 78 |
| j | 2.7 | 830 | 96 | 8.5 | 470 | 5 | 570 | 78 |
| k | 2.7 | 840 | 96 | 13.4 | 475 | 5 | 550 | 78 |
| l | 2.7 | 830 | 96 | 8.0 | 470 | 5 | 560 | 78 |
| m | 2.7 | 840 | 96 | 8.2 | 470 | 5 | 550 | 78 |
| n | 2.7 | 850 | 96 | 17.0 | 480 | 5 | 570 | 78 |
| o | 2.7 | 840 | 96 | 9.0 | 480 | 5 | 540 | 78 |
| p | 2.7 | 860 | 96 | 8.0 | 475 | 5 | 560 | 78 |
| q | 2.7 | 860 | 96 | 15.0 | 475 | 5 | 550 | 78 |
| r | 2.7 | 950 | 96 | 8.5 | 470 | 5 | 550 | 78 |
| s | 2.7 | 830 | 96 | 13.8 | 470 | 5 | 570 | 390 |
| t | 2.7 | 840 | 96 | 13.8 | 475 | 5 | 560 | 670 |
| u | 2.7 | 830 | 96 | 7.6 | 475 | 5 | 580 | 78 |
| v | 2.7 | 840 | 96 | 8.7 | 470 | 5 | 580 | 78 |
| w | 2.7 | 830 | 96 | 8.7 | 470 | 5 | 580 | 78 |

| CONDITION | ALLOYING TREATMENT ||| TEMPERING ||
| | RETENTION TEMPERATURE T4 (° C.) | TERTIARY COOLING RATE CR3 (° C./s) | TERTIARY COOLING STOP TEMPERATURE T5 (° C.) | RETENTION TEMPERATURE T6 (° C.) | RETENTION TIME t3 (s) |
|---|---|---|---|---|---|
| a | 540 | 10 | 170 | 280 | 8 |
| b | 550 | 10 | 170 | 320 | 10 |
| c | 550 | 10 | 170 | 300 | 9 |
| d | 550 | 10 | 170 | 330 | 10 |
| e | 520 | 10 | 170 | 320 | 10 |
| f | 550 | 10 | 170 | 320 | 10 |
| g | 550 | 10 | 290 | 320 | 9 |
| h | 560 | 10 | 210 | 320 | 10 |
| i | 550 | 10 | 30 | 310 | 10 |
| j | 550 | 10 | 20 | 20 | 0 |
| k | 550 | 10 | 170 | 280 | 7 |
| l | 560 | 10 | 170 | 200 | 0 |
| m | 550 | 10 | 170 | 470 | 15 |
| n | 550 | 10 | 170 | 320 | 4 |
| o | 540 | 10 | 170 | 310 | 70 |
| p | 550 | 10 | 170 | 320 | 500 |
| q | 570 | 10 | 170 | 320 | 10 |
| r | 550 | 10 | 170 | 320 | 10 |
| s | 540 | 10 | 170 | 300 | 9 |
| t | 540 | 10 | 170 | 300 | 9 |
| u | 540 | 10 | 40 | 300 | 91 |
| v | 540 | 10 | 30 | 340 | 100 |
| w | 550 | 10 | 150 | 310 | 94 |

HR: AVERAGE HEATING RATE AT NOT LESS THAN 750° C. NOR MORE THAN Ac3 POINT

From each of the obtained alloyed hot-dip galvanized steel sheets, a JIS No. 5 tensile test piece was taken in a direction orthogonal to a rolling direction, and a tensile test was conducted to measure a tensile strength (TS) and total elongation (EL). In accordance with "JFS T 1001 hole expansion test method" standardized by Japan Iron and Steel Federation, a hole expansion ratio (λ) was measured. Besides, a steel structure was identified according to the aforementioned method.

The hydrogen embrittlement resistance was evaluated through the following test method.

From each of the obtained alloyed hot-dip galvanized steel sheets, a test piece punched in a size of 30 mmφ with a clearance of 10% was taken, and the punched test piece was immersed in a hydrochloric acid aqueous solution with pH1 for 24 hours at the maximum. A punched end face of the test piece was observed every three hours, and the presence/ absence of crack was observed. The test piece in which no crack was recognized even after the immersion of 12 hours was evaluated as acceptable.

The obtained results are presented in Table 4 and Table 5 (continuation of Table 4). An underline in Table 4 or Table 5 indicates that the underlined numeric value is out of the range of the present invention.

TABLE 4

| TEST No. | STEEL TYPE | CONDITION | TS (MPa) | YS (MPa) | YR (%) | EL (%) | λ (%) | TIME UNTIL CRACK OCCURS (h) | Vα (%) | VP0 (%) | VUB (%) | Vγ (%) | VM (%) | VTM* (%) | AVERAGE EFFECTIVE CRYSTAL GRAIN DIAMETER (μm) | REMARKS |
|---|---|---|---|---|---|---|---|---|---|---|---|---|---|---|---|---|
| 1 | A | a | 1345 | 1055 | 78.4 | 8.3 | 50 | 15 | 0 | 0 | 15 | 1 | 84 | 80 | 4.7 | INVENTION EXAMPLE |
| 2 | A | b | 1303 | 1109 | 85.1 | 7.1 | 60 | 21 | 0 | 0 | 13 | 1 | 86 | 90 | 4.6 | INVENTION EXAMPLE |
| 3 | A | c | 1364 | 1100 | 80.6 | 7.7 | 55 | 18 | 0 | 0 | 10 | 2 | 88 | 90 | 4.8 | INVENTION EXAMPLE |
| 4 | A | d | 1054 | 682 | 64.7 | 13.8 | 31 | 15 | 39 | 0 | 13 | 3 | 45 | 95 | 5.0 | COMPARATIVE EXAMPLE |
| 5 | A | e | 1312 | 958 | 73.0 | 9.0 | 45 | 3 | 0 | 0 | 35 | 3 | 62 | 95 | 4.6 | COMPARATIVE EXAMPLE |
| 6 | A | j | 1406 | 1014 | 72.1 | 8.5 | 36 | 3 | 0 | 0 | 12 | 2 | 86 | 30 | 4.7 | COMPARATIVE EXAMPLE |
| 7 | A | u | 1337 | 1068 | 79.9 | 7.6 | 50 | 15 | 0 | 0 | 11 | 1 | 88 | 80 | 4.8 | INVENTION EXAMPLE |
| 8 | A | v | 1305 | 1092 | 83.7 | 7.5 | 47 | 15 | 0 | 0 | 13 | 0 | 87 | 90 | 4.8 | INVENTION EXAMPLE |
| 9 | A | w | 1330 | 1057 | 79.5 | 7.8 | 54 | 15 | 0 | 0 | 10 | 2 | 88 | 90 | 4.8 | INVENTION EXAMPLE |
| 10 | B | a | 1351 | 1027 | 76.0 | 8.4 | 43 | 15 | 0 | 0 | 14 | 4 | 82 | 70 | 4.6 | INVENTION EXAMPLE |
| 11 | B | b | 1310 | 1053 | 80.4 | 7.7 | 55 | 18 | 0 | 0 | 12 | 2 | 86 | 90 | 4.7 | INVENTION EXAMPLE |
| 12 | B | c | 1333 | 1101 | 82.6 | 7.6 | 63 | 21 | 0 | 0 | 10 | 1 | 89 | 95 | 4.8 | INVENTION EXAMPLE |
| 13 | C | d | 1395 | 1004 | 72.0 | 13.4 | 30 | 3 | 18 | 0 | 13 | 8 | 61 | 40 | 4.7 | COMPARATIVE EXAMPLE |
| 14 | D | a | 1379 | 1079 | 78.2 | 8.0 | 50 | ABSENCE OF CRACK | 0 | 0 | 3 | 2 | 95 | 85 | 3.2 | INVENTION EXAMPLE |
| 15 | D | b | 1337 | 1131 | 84.6 | 7.5 | 64 | ABSENCE OF CRACK | 0 | 0 | 3 | 0 | 97 | 95 | 3.2 | INVENTION EXAMPLE |
| 16 | D | c | 1350 | 1150 | 85.2 | 7.5 | 65 | ABSENCE OF CRACK | 0 | 0 | 0 | 0 | 100 | 95 | 3.1 | INVENTION EXAMPLE |
| 17 | E | a | 1315 | 1034 | 78.6 | 8.4 | 55 | ABSENCE OF CRACK | 0 | 0 | 2 | 1 | 97 | 90 | 3.0 | INVENTION EXAMPLE |
| 18 | E | j | 1388 | 996 | 71.8 | 8.5 | 45 | 3 | 0 | 0 | 3 | 2 | 95 | 35 | 2.7 | COMPARATIVE EXAMPLE |
| 19 | E | r | 1340 | 1134 | 84.6 | 7.6 | 65 | 6 | 0 | 0 | 0 | 1 | 99 | 90 | 6.8 | COMPARATIVE EXAMPLE |
| 20 | E | u | 1342 | 1036 | 77.2 | 8.4 | 56 | 18 | 0 | 0 | 2 | 1 | 97 | 90 | 3.0 | INVENTION EXAMPLE |
| 21 | E | v | 1312 | 1070 | 81.6 | 8.0 | 60 | 18 | 0 | 0 | 3 | 0 | 97 | 95 | 3.2 | INVENTION EXAMPLE |
| 22 | E | w | 1344 | 1033 | 76.9 | 8.0 | 58 | 18 | 0 | 0 | 3 | 0 | 97 | 95 | 3.4 | INVENTION EXAMPLE |
| 23 | F | a | 1324 | 1019 | 77.0 | 8.8 | 60 | ABSENCE OF CRACK | 5 | 0 | 7 | 0 | 88 | 95 | 3.5 | INVENTION EXAMPLE |
| 24 | G | a | 1401 | 1092 | 77.9 | 8.0 | 45 | 15 | 0 | 0 | 13 | 2 | 85 | 90 | 4.7 | INVENTION EXAMPLE |
| 25 | H | a | 1380 | 1094 | 79.3 | 8.1 | 55 | ABSENCE OF CRACK | 0 | 0 | 2 | 2 | 96 | 90 | 2.6 | INVENTION EXAMPLE |
| 26 | H | b | 1331 | 1122 | 84.3 | 7.6 | 65 | ABSENCE OF CRACK | 0 | 0 | 2 | 1 | 97 | 95 | 2.5 | INVENTION EXAMPLE |
| 27 | H | c | 1348 | 1125 | 83.5 | 7.7 | 62 | ABSENCE OF CRACK | 0 | 0 | 0 | 0 | 100 | 95 | 3.0 | INVENTION EXAMPLE |

TABLE 4-continued

| TEST No. | STEEL TYPE | CONDITION | TS (MPa) | YS (MPa) | YR (%) | EL (%) | λ (%) | TIME UNTIL CRACK OCCURS (h) | Vα (%) | VPθ (%) | VUB (%) | Vγ (%) | VM (%) | VTM* (%) | AVERAGE EFFECTIVE CRYSTAL GRAIN DIAMETER (μm) | REMARKS |
|---|---|---|---|---|---|---|---|---|---|---|---|---|---|---|---|---|
| 28 | H | f | 1325 | 1069 | 80.7 | 9.1 | 48 | ABSENCE OF CRACK | 0 | 0 | 8 | 2 | 90 | 90 | 2.5 | INVENTION EXAMPLE |
| 29 | H | i | 1334 | 1136 | 85.2 | 7.5 | 67 | ABSENCE OF CRACK | 0 | 0 | 0 | 0 | 100 | 95 | 2.7 | INVENTION EXAMPLE |
| 30 | H | k | 1405 | 1063 | 75.7 | 8.5 | 40 | 15 | 0 | 0 | 3 | 2 | 95 | 60 | 2.7 | INVENTION EXAMPLE |
| 31 | H | l | 1438 | 1011 | 70.3 | 8.6 | 35 | 3 | 0 | 0 | 2 | 3 | 95 | 40 | 2.6 | COMPARATIVE EXAMPLE |
| 32 | H | m | 1201 | 1137 | 94.7 | 6.6 | 70 | ABSENCE OF CRACK | 0 | 0 | 2 | 0 | 98 | 100 | 3.2 | INVENTION EXAMPLE |
| 33 | H | n | 1333 | 1116 | 83.7 | 8.0 | 65 | ABSENCE OF CRACK | 0 | 0 | 2 | 1 | 97 | 90 | 2.8 | INVENTION EXAMPLE |
| 34 | H | o | 1308 | 1124 | 85.9 | 7.9 | 60 | 15 | 0 | 0 | 2 | 1 | 97 | 100 | 3.0 | INVENTION EXAMPLE |

TS: TENSILE STRENGTH
YS: YIELD STRENGTH
YR: 100 × YIELD STRENGTH/TENSILE STRENGTH
EL: TOTAL ELONGATION
λ: HOLE EXPANSION RATIO
Vα: AREA RATIO OF FERRITE
VPθ: AREA RATIO OF PEARLITE + CEMENTITE
VUB: AREA RATIO OF UPPER BAINITE
Vγ: AREA RATIO OF RETAINED AUSTENITE
VM: AREA RATIO OF MARTENSITE
VTM*: RATIO OF MARTENSITE HAVING Fe CARBIDES AT NUMBER DENSITY OF: $1.0 \times 10^6/\text{mm}^2$ OR MORE WITH RESPECT TO ENTIRE AMOUNT OF MARTENSITE

TABLE 5

| TEST No. | STEEL TYPE | CONDITION | TS (MPa) | YS (MPa) | YR (%) | EL (%) | λ (%) | TIME UNTIL CRACK OCCURS (h) | Vα (%) | VPθ (%) | VUB (%) | Vγ (%) | VM (%) | VTM* (%) | AVERAGE EFFECTIVE CRYSTAL GRAIN DIAMETER (μm) | REMARKS |
|---|---|---|---|---|---|---|---|---|---|---|---|---|---|---|---|---|
| 35 | H | p | 1247 | 1165 | 93.4 | 7.0 | 65 | 18 h | 0 | 0 | 3 | 0 | 97 | 100 | 3.0 | INVENTION EXAMPLE |
| 36 | H | q | 1333 | 1121 | 84.1 | 8.0 | 63 | ABSENCE OF CRACK | 0 | 0 | 3 | 2 | 95 | 95 | 2.7 | INVENTION EXAMPLE |
| 37 | H | r | 1375 | 1158 | 84.2 | 7.4 | 65 | 6 h | 0 | 0 | 0 | 1 | 99 | 95 | 7.0 | COMPARATIVE EXAMPLE |
| 38 | H | s | 1336 | 1095 | 82.0 | 8.2 | 59 | ABSENCE OF CRACK | 0 | 0 | 0 | 5 | 95 | 95 | 2.8 | INVENTION EXAMPLE |
| 40 | H | u | 1368 | 1076 | 78.7 | 8.2 | 56 | 18 h | 0 | 0 | 2 | 3 | 95 | 90 | 2.8 | INVENTION EXAMPLE |
| 41 | H | v | 1335 | 1127 | 84.4 | 7.9 | 65 | 18 h | 0 | 0 | 2 | 0 | 98 | 95 | 2.9 | INVENTION EXAMPLE |
| 42 | H | w | 1343 | 1100 | 81.9 | 8.1 | 60 | 18 h | 0 | 0 | 2 | 0 | 98 | 95 | 2.8 | INVENTION EXAMPLE |
| 43 | I | b | 1314 | 1123 | 85.5 | 7.5 | 65 | 18 h | 0 | 0 | 7 | 1 | 92 | 95 | 2.8 | INVENTION EXAMPLE |
| 44 | J | a | 1314 | 1059 | 80.6 | 8.8 | 65 | ABSENCE OF CRACK | 0 | 0 | 8 | 1 | 91 | 95 | 2.9 | INVENTION EXAMPLE |
| 45 | K | a | 1378 | 1086 | 78.8 | 8.2 | 50 | ABSENCE OF CRACK | 0 | 0 | 7 | 2 | 91 | 95 | 1.9 | INVENTION EXAMPLE |
| 46 | K | j | 1414 | 1006 | 71.1 | 8.7 | 35 | 3 h | 0 | 0 | 6 | 3 | 91 | 25 | 1.9 | COMPARATIVE EXAMPLE |
| 47 | L | a | 1350 | 1077 | 79.8 | 8.1 | 55 | ABSENCE OF CRACK | 0 | 0 | 6 | 3 | 91 | 95 | 1.9 | INVENTION EXAMPLE |
| 48 | M | a | 1326 | 1068 | 80.5 | 8.0 | 45 | 15 h | 0 | 0 | 13 | 3 | 84 | 95 | 3.7 | INVENTION EXAMPLE |
| 49 | N | a | 1342 | 1111 | 82.8 | 8.5 | 55 | ABSENCE OF CRACK | 0 | 0 | 7 | 2 | 91 | 95 | 1.8 | INVENTION EXAMPLE |
| 50 | O | a | 1316 | 1028 | 78.1 | 8.9 | 45 | 18 h | 0 | 0 | 15 | 2 | 83 | 95 | 1.7 | INVENTION EXAMPLE |
| 51 | P | a | 1357 | 1067 | 78.6 | 8.7 | 60 | ABSENCE OF CRACK | 0 | 0 | 0 | 1 | 99 | 90 | 2.8 | INVENTION EXAMPLE |
| 52 | Q | a | 1346 | 1041 | 77.3 | 8.4 | 60 | ABSENCE OF CRACK | 0 | 0 | 0 | 1 | 99 | 90 | 2.9 | INVENTION EXAMPLE |
| 53 | R | a | 1318 | 1009 | 76.6 | 9.0 | 50 | ABSENCE OF CRACK | 0 | 0 | 7 | 3 | 90 | 90 | 3.0 | INVENTION EXAMPLE |
| 54 | S | a | 1346 | 1113 | 82.7 | 8.0 | 61 | ABSENCE OF CRACK | 0 | 0 | 3 | 1 | 96 | 95 | 3.0 | INVENTION EXAMPLE |
| 55 | T | a | 1342 | 1100 | 82.0 | 7.9 | 63 | ABSENCE OF CRACK | 0 | 0 | 4 | 1 | 95 | 95 | 2.7 | INVENTION EXAMPLE |

TABLE 5-continued

| TEST No. | STEEL TYPE | CONDITION | TS (MPa) | YS (MPa) | YR (%) | EL (%) | λ (%) | TIME UNTIL CRACK OCCURS (h) | Vα (%) | VPθ (%) | VUB (%) | Vγ (%) | VM (%) | VTM* (%) | AVERAGE EFFECTIVE CRYSTAL GRAIN DIAMETER (μm) | REMARKS |
|---|---|---|---|---|---|---|---|---|---|---|---|---|---|---|---|---|
| 56 | U | a | 1359 | 1092 | 80.4 | 8.4 | 66 | ABSENCE OF CRACK | 0 | 0 | 3 | 1 | 96 | 95 | 2.8 | INVENTION EXAMPLE |
| 57 | V | a | 1352 | 1085 | 80.3 | 7.7 | 67 | ABSENCE OF CRACK | 0 | 0 | 4 | 1 | 95 | 95 | 2.7 | INVENTION EXAMPLE |
| 60 | Y | a | 1366 | 1120 | 82.0 | 8.1 | 57 | ABSENCE OF CRACK | 0 | 0 | 4 | 2 | 94 | 95 | 2.7 | INVENTION EXAMPLE |
| 61 | Z | a | 1031 | 677 | 65.7 | 14.5 | 40 | ABSENCE OF CRACK | 36 | 0 | 43 | 6 | 15 | 0 | 5.5 | COMPARATIVE EXAMPLE |
| 62 | AA | a | 1101 | 882 | 80.1 | 9.0 | 55 | ABSENCE OF CRACK | 0 | 0 | 4 | 2 | 94 | 95 | 3.1 | COMPARATIVE EXAMPLE |
| 63 | AB | a | 1796 | 1406 | 78.3 | 8.2 | 20 | 3 h | 0 | 0 | 0 | 8 | 92 | 80 | 2.5 | COMPARATIVE EXAMPLE |
| 64 | AC | a | 1201 | 810 | 67.4 | 9.8 | 30 | 6 h | 7 | 0 | 28 | 3 | 62 | 90 | 4.5 | COMPARATIVE EXAMPLE |
| 65 | AD | a | 1156 | 743 | 64.3 | 12.2 | 30 | 3 h | 15 | 0 | 39 | 2 | 44 | 90 | 3.1 | COMPARATIVE EXAMPLE |
| 66 | AE | a | 1675 | 1128 | 67.3 | 8.6 | 15 | 3 h | 0 | 0 | 0 | 9 | 91 | 35 | 2.3 | COMPARATIVE EXAMPLE |
| 67 | AF | a | 1163 | 874 | 75.2 | 13.1 | 42 | 3 h | 25 | 0 | 30 | 3 | 42 | 95 | 3.7 | COMPARATIVE EXAMPLE |
| 68 | AG | a | 1312 | 1121 | 85.4 | 8.1 | 52 | ABSENCE OF CRACK | 20 | 0 | 13 | 2 | 65 | 80 | 3.5 | COMPARATIVE EXAMPLE |
| 69 | AH | a | 1329 | 1092 | 82.2 | 9.2 | 23 | 3 h | 8 | 0 | 5 | 2 | 85 | 92 | 2.9 | COMPARATIVE EXAMPLE |

TS: TENSILE STRENGTH
YS: YIELD STRENGTH
YR: 100 × YIELD STRENGTH/TENSILE STRENGTH
EL: TOTAL ELONGATION
λ: HOLE EXPANSION RATIO
Vα: AREA RATIO OF FERRITE
VPθ: AREA RATIO OF PEARLITE + CEMENTITE
VUB: AREA RATIO OF UPPER BAINITE
Vγ: AREA RATIO OF RETAINED AUSTENITE
VM: AREA RATIO OF MARTENSITE
VTM*: RATIO OF MARTENSITE HAVING Fe CARBIDES AT NUMBER DENSITY OF $1.0 \times 10^6/mm^2$ OR MORE WITH RESPECT TO ENTIRE AMOUNT OF MARTENSITE In each of the invention examples in which the chemical composition and the manufacturing method are within the range of the present invention, the steel structure is within the range of the present invention, and the tensile strength of 1300 MPa or more, the yield ratio (YR) of 75% or more, and the good hydrogen embrittlement resistance are obtained. On the other hand, in each of the comparative examples in which either or both of the chemical composition and the steel structure are out of the range of the present invention, the desired mechanical properties are not obtained.

Example 2

On some of the steel sheets having the chemical compositions presented in Table 1, hot rolling was performed under hot-rolling conditions presented in Table 6 to obtain hot-rolled steel sheets each having a thickness of 3 mm. The hot-rolled steel sheets were subjected to pickling, and then subjected to cold rolling under cold-rolling conditions (at reduction ratios) presented in Table 6 to obtain cold-rolled steel sheets each having a thickness of 1.2 mm.

TABLE 6

| | HOT ROLLING | | | | | | | | COLD ROLLING |
|---|---|---|---|---|---|---|---|---|---|
| | SLAB HEATING | ROUGH ROLLING TOTAL | FINISH ROLLING | | | | | | |
| CONDITION | TEMPERATURE (° C.) | REDUCTION RATIO (%) | REDUCTION RATIO R1 (%) | REDUCTION RATIO R2 (%) | TEMPERATURE FT (° C.) | Δt (s) | COOLING RATE (° C./s) | COILING TEMPERATURE (° C.) | REDUCTION RATIO (%) |
| x | 1250 | 85 | 90 | 18 | 900 | 1.1 | 10 | 550 | 50 |
| y | 1250 | 85 | 90 | 18 | 900 | 1.2 | 10 | 550 | 50 |
| z | 1250 | 85 | 90 | 18 | 900 | 0.9 | 10 | 550 | 50 |
| aa | 1250 | 85 | 90 | 18 | 900 | 1.1 | 10 | 550 | 50 |
| ab | 1250 | 85 | 90 | 18 | 900 | 1.4 | 10 | 550 | 50 |

R1: TOTAL REDUCTION RATIO FROM 1050° C. OR LESS TO POINT BEFORE FINISH FINAL PASS
R2: REDUCTION RATIO AT FINISH FINAL PASS
FT: TEMPERATURE AT FINISH FINAL PASS
Δt: LAPSED TIME FROM COMPLETION OF FINISH ROLLING TO START OF COOLING

The obtained cold-rolled steel sheets were subjected to a heat treatment under heat treatment conditions presented in FIG. 2 and Table 7, and then subjected to hot-dip galvanizing under plating conditions presented in FIG. 2 and Table 7. Besides, secondary cooling, reheating, and tertiary cooling were performed under conditions presented in FIG. 2 and Table 7, to thereby obtain alloyed hot-dip galvanized steel sheets.

TABLE 7

| | CONTINUOUS ANNEALING | | | | | | HOT-DIP GALVANIZING TREATMENT | |
|---|---|---|---|---|---|---|---|---|
| | | PRIMARY | | PRIMARY COOLING | | SECONDARY | | |
| CONDITION | HEATING RATE HR (° C./s) | RETENTION TEMPERATURE T1 (° C.) | RETENTION TIME t1 (s) | COOLING RATE CR1 (° C./s) | STOP TEMPERATURE T2 (° C.) | COOLING RATE CR2 (° C./s) | RETENTION TEMPERATURE T3 (° C.) | RETENTION TIME t2 (s) |
| x | 2.7 | 840 | 96 | 10.3 | 470 | 4 | 560 | 78 |
| y | 2.7 | 820 | 96 | 10.3 | 475 | 4 | 560 | 78 |
| z | 2.7 | 830 | 96 | 10.3 | 470 | 4 | 570 | 78 |
| aa | 2.7 | 840 | 96 | 10.3 | 475 | 4 | 550 | 78 |
| ab | 2.7 | 840 | 96 | 10.3 | 470 | 4 | 550 | 78 |

TABLE 7-continued

| | | ALLOYING TREATMENT (ONLY COOLING) | | | | |
|---|---|---|---|---|---|---|
| | | RETENTION | TERTIARY COOLING | TERTIARY COOLING STOP | TEMPERING | |
| | CONDITION | TEMPERATURE T4 (° C.) | RATE CR3 (° C./s) | TEMPERATURE T5 (° C.) | RETENTION TEMPERATURE T6 (° C.) | RETENTION TIME t3 (s) |
| | x | ABSENCE | 8 | 170 | 300 | 9 |
| | y | ABSENCE | 8 | 20 | 320 | 9 |
| | z | ABSENCE | 8 | 170 | 350 | 10 |
| | aa | ABSENCE | 8 | 20 | 310 | 95 |
| | ab | ABSENCE | 8 | 20 | 280 | 90 |

HR: AVERAGE HEATING RATE AT NOT LESS THAN 750° C. NOR MORE THAN Ac3 POINT

From each of the obtained alloyed hot-dip galvanized steel sheets, a JIS No. 5 tensile test piece was taken in a direction orthogonal to a rolling direction, and a tensile test was conducted to measure a tensile strength (TS) and total elongation (EL). In accordance with "JFS T 1001 hole expansion test method" standardized by Japan Iron and Steel Federation, a hole expansion ratio (λ) was measured. A steel structure was identified according to the aforementioned method.

The hydrogen embrittlement resistance was evaluated through the following test method.

From each of the obtained hot-dip galvanized steel sheets, a test piece punched in a size of 30 mmφ with a clearance of 10% was taken, and the punched test piece was immersed in a hydrochloric acid aqueous solution with pH1 for 24 hours at the maximum. A punched end face of the test piece was observed every three hours, and the presence/absence of crack was observed. The test piece in which no crack was recognized even after the immersion of 12 hours was evaluated as acceptable.

The obtained results are presented in Table 8.

TABLE 8

| TEST No. | STEEL TYPE | CONDITION | TS (MPa) | YS (MPa) | YR (%) | EL (%) | λ (%) | TIME UNTIL CRACK OCCURS (h) |
|---|---|---|---|---|---|---|---|---|
| 71 | A | x | 1324 | 1054 | 79.6 | 8.2 | 50 | 15 |
| 72 | A | y | 1310 | 1067 | 81.5 | 8.0 | 55 | 18 |
| 73 | A | aa | 1330 | 1073 | 80.7 | 7.9 | 50 | 18 |
| 74 | A | ab | 1312 | 1086 | 82.8 | 8.0 | 47 | 15 |
| 75 | E | x | 1367 | 1101 | 80.5 | 7.9 | 60 | ABSENCE OF CRACK |
| 76 | E | y | 1343 | 1118 | 83.2 | 8.1 | 65 | ABSENCE OF CRACK |
| 77 | E | aa | 1358 | 1045 | 77.0 | 8.4 | 57 | 18 |
| 78 | E | ab | 1375 | 1087 | 79.1 | 8.0 | 55 | 18 |
| 79 | H | x | 1389 | 1092 | 78.6 | 8.0 | 50 | ABSENCE OF CRACK |
| 80 | H | y | 1356 | 1110 | 81.9 | 7.7 | 55 | ABSENCE OF CRACK |
| 81 | H | z | 1320 | 1129 | 85.5 | 7.5 | 65 | ABSENCE OF CRACK |
| 82 | H | aa | 1361 | 1072 | 78.8 | 7.8 | 50 | 18 |
| 83 | H | ab | 1399 | 1074 | 76.8 | 8.2 | 46 | 18 |

| TEST No. | Vα (%) | VPθ (%) | VUB (%) | Vγ (%) | VM (%) | VTM* (%) | AVERAGE EFFECTIVE CRYSTAL GRAIN DIAMETER (μm) | REMARKS |
|---|---|---|---|---|---|---|---|---|
| 71 | 0 | 0 | 14 | 1 | 85 | 80 | 4.8 | INVENTION EXAMPLE |
| 72 | 0 | 0 | 13 | 1 | 86 | 90 | 4.7 | INVENTION EXAMPLE |
| 73 | 0 | 0 | 12 | 3 | 85 | 95 | 4.7 | INVENTION EXAMPLE |
| 74 | 0 | 0 | 12 | 1 | 87 | 95 | 4.8 | INVENTION EXAMPLE |
| 75 | 0 | 0 | 2 | 1 | 97 | 90 | 2.6 | INVENTION EXAMPLE |
| 76 | 0 | 0 | 2 | 1 | 97 | 95 | 2.8 | INVENTION EXAMPLE |

TABLE 8-continued

| | | | | | | | | |
|---|---|---|---|---|---|---|---|---|
| 77 | 0 | 0 | 2 | 1 | 97 | 90 | 3.1 | INVENTION EXAMPLE |
| 78 | 0 | 0 | 2 | 0 | 98 | 90 | 3.2 | INVENTION EXAMPLE |
| 79 | 0 | 0 | 1 | 1 | 98 | 90 | 2.8 | INVENTION EXAMPLE |
| 80 | 0 | 0 | 2 | 2 | 96 | 95 | 2.7 | INVENTION EXAMPLE |
| 81 | 0 | 0 | 1 | 0 | 99 | 95 | 2.8 | INVENTION EXAMPLE |
| 82 | 0 | 0 | 2 | 0 | 98 | 90 | 3.3 | INVENTION EXAMPLE |
| 83 | 0 | 0 | 2 | 1 | 97 | 90 | 3.2 | INVENTION EXAMPLE |

TS: TENSILE STRENGTH
YS: YIELD STRENGTH
YR: 100 × YIELD STRENGTH/TENSILE STRENGTH
EL: TOTAL ELONGATION
λ: HOLE EXPANSION RATIO
Vα: AREA RATIO OF FERRITE
VPθ: AREA RATIO OF PEARLITE + CEMENTITE
VUB: AREA RATIO OF UPPER BAINITE
Vγ: AREA RATIO OF RETAINED AUSTENITE
VM: AREA RATIO OF MARTENSITE
VTM*: RATIO OF MARTENSITE HAVING Fe CARBIDES AT NUMBER DENSITY OF $1.0 \times 10^6/mm^2$ OR MORE WITH RESPECT TO ENTIRE AMOUNT OF MARTENSITE In each of the examples (invention examples) presented in Table 8, the chemical composition is within the range of the present invention and the steel structure is within the range of the present invention, so that the tensile strength of 1300 MPa or more, the yield ratio (YR) of 75% or more, and the good hydrogen embrittlement resistance are obtained.

INDUSTRIAL APPLICABILITY

The present invention can be utilized in the industry related to a steel sheet suitable for a vehicle body or a component of an automobile, for example.

The invention claimed is:

1. A hot-dip galvanized steel sheet, comprising:
a chemical composition represented by:
in terms of mass %,
C: 0.14 to 0.3%;
Si: 0.001 to 2.0%;
Mn: 2.0 to 4.0%;
P: 0.05% or less;
S: 0.01% or less;
N: 0.01% or less;
Al: 0.001 to 1.0%;
Ti: 0.001 to 0.10%;
B: 0.0001 to 0.01%;
Mo: 0 to 0.50%;
Cr: 0 to 0.80%;
Ni: 0 to 1.00%;
Cu: 0 to 1.00%;
V: 0 to 0.50%;
Nb: 0.0 to 0.10%;
Ca: 0.00 to 0.01%;
Mg: 0.00 to 0.01%;
REM: 0.00 to 0.01%;
Bi: 0.00 to 0.01%; and
the balance: Fe and impurities; and
a steel structure represented by:
in terms of area ratio,
polygonal ferrite: 10% or less;
upper bainite: 20% or less;
retained austenite: 5% or less; and
martensite: 70% or more,
when the area ratio is calculated from a microscopic photograph of a cross section in a rolling direction of the steel sheet for polygonal ferrite, upper bainite, pearlite, cementite, martensite, and tempered martensite and is calculated from a peak area ratio of bcc and fcc by an X-ray diffraction for retained austenite, wherein:

martensite having Fe carbides at a number density of $1 \times 10^6/mm^2$ or more is contained by 50% or more, in terms of area ratio, with respect to the entire amount of martensite, when the number density is calculated from a microscopic photograph of a cross section in a rolling direction of the steel sheet; and the steel structure has an average effective crystal grain diameter of 5.0 µm or less, when measured by an electron back scatter diffraction pattern-orientation image microscopy (EBSP-OIM) method.

2. The hot-dip galvanized steel sheet according to claim 1, wherein an amount of solid-solution B is 0.0010 mass % to 0.0100 mass %, and a prior austenite grain diameter is 1.0 µm to 7.0 µm, when the amount of solid-solution B is calculated by subtracting a mass of B contained in a precipitate from a total mass of B contained in the hot-dip galvanized steel sheet, and the prior austenite grain diameter is calculated from a microscopic photograph of a cross section in a rolling direction of the steel sheet.

3. The hot-dip galvanized steel sheet according to claim 1, wherein a product of an amount of solid-solution B and a prior austenite grain diameter is 0.0010 mass %·µm or more, when the amount of solid-solution B is calculated by subtracting a mass of B contained in a precipitate from a total mass of B contained in the hot-dip galvanized steel sheet, and the prior austenite grain diameter is calculated from a microscopic photograph of a cross section in a rolling direction of the steel sheet.

4. The hot-dip galvanized steel sheet according to claim 1, wherein in the chemical composition, Mo: 0.001 to 0.50% is satisfied.

5. The hot-dip galvanized steel sheet according to claim 1, wherein in the chemical composition,
Cr: 0.001 to 0.80%,
Ni: 0.001 to 1.00%, or
Cu: 0.001 to 1.00%, or
any combination thereof is satisfied.

6. The hot-dip galvanized steel sheet according to claim 1, wherein
in the chemical composition,
V: 0.001 to 0.50%, or
Nb: 0.001 to 0.10%, or
both thereof are satisfied.

7. The hot-dip galvanized steel sheet according to claim 1, wherein
in the chemical composition,
Ca: 0.0001 to 0.01%,
Mg: 0.0001 to 0.01%,
REM: 0.0001 to 0.01%, or
Bi: 0.0001 to 0.01%, or
any combination thereof is satisfied.

* * * * *